(12) United States Patent
Kuo et al.

(10) Patent No.: US 8,228,406 B2
(45) Date of Patent: Jul. 24, 2012

(54) ADAPTIVE LENS SHADING CORRECTION

(75) Inventors: David Daming Kuo, San Jose, CA (US); Haitao Guo, San Jose, CA (US); Jay David Zipnick, Morgan Hill, CA (US); Ting Chen, Sunnyvale, CA (US); Sumit Chawla, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 230 days.

(21) Appl. No.: 12/794,632

(22) Filed: Jun. 4, 2010

(65) Prior Publication Data

US 2011/0298944 A1    Dec. 8, 2011

(51) Int. Cl.
    *H04N 9/64*      (2006.01)
(52) U.S. Cl. .......................................... 348/251; 382/274
(58) Field of Classification Search ................ 348/222.1, 348/251; 382/167, 274
See application file for complete search history.

(56) References Cited

U.S. PATENT DOCUMENTS

| | | |
|---|---|---|
| 5,008,739 A | 4/1991 | D'Luna et al. |
| 5,512,961 A | 4/1996 | Cappels, Sr. |
| 5,714,207 A | 2/1998 | Kuo |
| 5,714,842 A | 2/1998 | Krause et al. |
| 5,853,820 A | 12/1998 | Kuo et al. |
| 5,861,196 A | 1/1999 | Kuo et al. |
| 5,958,545 A | 9/1999 | Kuo et al. |
| 6,285,344 B1 | 9/2001 | Everard et al. |
| 6,327,641 B1 | 12/2001 | Xiao et al. |
| 6,370,273 B1 | 4/2002 | Kuo |
| 6,400,471 B1 | 6/2002 | Kuo et al. |
| 6,542,198 B1 | 4/2003 | Hung et al. |
| 6,597,395 B1 | 7/2003 | Kim et al. |
| 6,618,508 B1 | 9/2003 | Webb et al. |
| 6,627,254 B1 | 9/2003 | Angelo et al. |
| 6,642,068 B1 | 11/2003 | Hayes et al. |
| 6,686,925 B1 | 2/2004 | Cappels |
| 6,687,295 B1 | 2/2004 | Webb et al. |
| 6,707,459 B1 | 3/2004 | Graves et al. |
| 6,714,720 B1 | 3/2004 | Lightstone et al. |
| 6,746,754 B1 | 6/2004 | Wang et al. |
| 6,864,042 B1 | 3/2005 | Kuo et al. |
| 6,866,883 B2 | 3/2005 | Wang et al. |
| 6,878,426 B2 | 4/2005 | Angelo et al. |

(Continued)

FOREIGN PATENT DOCUMENTS

EP      1962517 A1    8/2008

(Continued)

OTHER PUBLICATIONS

U.S. Appl. No. 12/794,642, filed Jun. 4, 2010, Ting Chen.

(Continued)

*Primary Examiner* — Jason Chan
*Assistant Examiner* — Gary C Vieaux
(74) *Attorney, Agent, or Firm* — Fletcher Yoder PC

(57) ABSTRACT

Systems, methods, and devices for applying lens shading correction to image data captured by an image sensor are provided. In one embodiment, multiple lens shading adaptation functions, each modeled based on the response of a color channel to a reference illuminant, are provided. An image frame from the image data may be analyzed to select a lens shading adaptation function corresponding to a reference illuminant that most closely matches a current illuminant. The selected lens shading function may then be used to adjust a set of lens shading parameters.

26 Claims, 24 Drawing Sheets

U.S. PATENT DOCUMENTS

| | | | |
|---|---|---|---|
| 6,957,511 | B1 | 10/2005 | Leigh et al. |
| 6,979,831 | B2 | 12/2005 | Chauhan et al. |
| 7,009,391 | B2 | 3/2006 | Lee et al. |
| 7,028,743 | B1 | 4/2006 | Wang et al. |
| 7,215,813 | B2 | 5/2007 | Graves et al. |
| 7,242,411 | B2 | 7/2007 | Graves et al. |
| 7,351,484 | B2 | 4/2008 | Wang et al. |
| 7,353,284 | B2 | 4/2008 | Agnoli et al. |
| 7,379,105 | B1 | 5/2008 | Frank et al. |
| 7,382,711 | B2 | 6/2008 | Chauhan et al. |
| 7,387,848 | B2 | 6/2008 | Angelo et al. |
| 7,412,654 | B1 | 8/2008 | Cappels, Sr. et al. |
| 7,447,351 | B2 | 11/2008 | Ubillos |
| 7,471,823 | B2 | 12/2008 | Ubillos et al. |
| 7,477,779 | B2 | 1/2009 | Graves et al. |
| 7,519,229 | B2 | 4/2009 | Wallace et al. |
| 7,596,280 | B2 | 9/2009 | Bilbrey et al. |
| 7,609,304 | B2 | 10/2009 | Kobayashi et al. |
| 7,617,481 | B2 | 11/2009 | Joe et al. |
| 7,668,099 | B2 | 2/2010 | Agnoli et al. |
| 7,688,356 | B2 | 3/2010 | Morishita |
| 7,693,341 | B2 | 4/2010 | Pettigrew et al. |
| 7,711,200 | B2 | 5/2010 | Ouzilevski et al. |
| 2002/0008766 | A1 | 1/2002 | Tariki |
| 2003/0065495 | A1 | 4/2003 | Lee et al. |
| 2004/0050480 | A1 | 3/2004 | Angelo et al. |
| 2004/0058060 | A1 | 3/2004 | Angelo et al. |
| 2004/0209048 | A1 | 10/2004 | Wang et al. |
| 2004/0255338 | A1 | 12/2004 | Agnoli et al. |
| 2004/0255339 | A1 | 12/2004 | Agnoli et al. |
| 2005/0083047 | A1 | 4/2005 | Lee et al. |
| 2005/0157188 | A1 | 7/2005 | Kubo |
| 2005/0184256 | A1 | 8/2005 | Chauhan et al. |
| 2005/0185562 | A1 | 8/2005 | Chauhan et al. |
| 2005/0225807 | A1 | 10/2005 | Fainstain et al. |
| 2005/0226513 | A1 | 10/2005 | Wallace et al. |
| 2006/0117009 | A1 | 6/2006 | Joe et al. |
| 2006/0196625 | A1 | 9/2006 | Wang et al. |
| 2006/0233252 | A1 | 10/2006 | Bhattacharya et al. |
| 2006/0233259 | A1 | 10/2006 | Chou et al. |
| 2007/0071342 | A1 | 3/2007 | Bilbrey et al. |
| 2007/0071343 | A1 | 3/2007 | Zipnick et al. |
| 2007/0071344 | A1 | 3/2007 | Ouzilevski et al. |
| 2007/0074038 | A1 | 3/2007 | Arenburg et al. |
| 2007/0211154 | A1 | 9/2007 | Mahmoud et al. |
| 2007/0263099 | A1 | 11/2007 | Motta et al. |
| 2008/0043133 | A1 | 2/2008 | Sasaki et al. |
| 2008/0074515 | A1 | 3/2008 | Takane |
| 2008/0088857 | A1 | 4/2008 | Zimmer et al. |
| 2008/0088858 | A1 | 4/2008 | Marcu et al. |
| 2008/0094482 | A1 | 4/2008 | Yoshimura |
| 2008/0218615 | A1 | 9/2008 | Huang et al. |
| 2008/0250469 | A1 | 10/2008 | Agnoli et al. |
| 2008/0266413 | A1 | 10/2008 | Cohen et al. |
| 2008/0284915 | A1 | 11/2008 | Figueroa et al. |
| 2008/0297816 | A1 | 12/2008 | Nikkanen et al. |
| 2009/0037819 | A1 | 2/2009 | Cappels, Sr. et al. |
| 2009/0168898 | A1 | 7/2009 | Wallace et al. |
| 2009/0169124 | A1 | 7/2009 | Wallace et al. |
| 2009/0202173 | A1 | 8/2009 | Weiss et al. |
| 2009/0251567 | A1 | 10/2009 | Guichard et al. |
| 2009/0257507 | A1 | 10/2009 | Guo et al. |
| 2009/0268053 | A1 | 10/2009 | Wang et al. |
| 2009/0273679 | A1 | 11/2009 | Gere et al. |
| 2010/0039530 | A1 | 2/2010 | Guo et al. |
| 2010/0066857 | A1 | 3/2010 | Ovsiannikov |
| 2010/0091039 | A1 | 4/2010 | Marcu et al. |
| 2010/0110222 | A1 | 5/2010 | Smith et al. |
| 2011/0091101 | A1* | 4/2011 | Cote et al. ............... 382/167 |
| 2011/0149112 | A1* | 6/2011 | Muukki et al. .......... 348/231.6 |

FOREIGN PATENT DOCUMENTS

| | | |
|---|---|---|
| JP | 2006-229425 A | 8/2006 |
| JP | 2008-118491 A | 5/2008 |

OTHER PUBLICATIONS

U.S. Appl. No. 12/794,638, filed Jun. 4, 2010, Andrew Yanowitz.
U.S. Appl. No. 12/582,377, filed Oct. 20, 2009, Guy Cote.
U.S. Appl. No. 12/873,999, filed Sep. 1, 2010, Guy Cote et al.
U.S. Appl. No. 12/873,973, filed Sep. 1, 2010, Guy Cote et al.
U.S. Appl. No. 12/789,810, filed May 28, 2010, Guy Cote et al.
U.S. Appl. No. 12/789,815, May 28, 2010, Guy Cote et al.
Touraj Tajbakhsh; "Color lens shade compensation achieved by linear regression of piece-wise bilinear spline functions;" Proc. SPIE: Digital Photography VI, vol. 7537, Jan. 18, 2010, pp. 1-20 (XP040516000).

* cited by examiner

ADAPTIVE LENS SHADING CORRECTION

BACKGROUND

The present disclosure relates generally to image processing and, more particularly, to intercepting and processing of raw image data.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many electronic devices include cameras or other image capture devices. These image capture devices may output frames of raw image data, which may be processed before being saved as a processed image or displayed on the electronic device. For efficiency, many electronic devices may process such raw image data through a dedicated image processing pipeline, such as an image signal processor (ISP).

Many parameters for controlling the dedicated image processing pipeline may be determined based on statistics associated with the frame of image data that is being processed. However, since the statistics may be determined only after a frame of raw image data has been partially processed, control parameters for early stages of the dedicated image processing pipeline may be determined based on statistics from previous frames of image data, rather than the current frame of image data. Thus, in some instances, the early steps of the hardware pipeline may be miscalibrated because of oscillations and imprecision, and the resulting image may be unsatisfactory. Moreover, even if the early steps of the hardware pipeline are properly calibrated, the resulting image sometimes may be unsatisfactory for other reasons. Nevertheless, the only remedy may involve post-processing the unsatisfactorily processed image.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to systems, methods, and devices for dual processing of raw image data by main image processing and alternative image processing capabilities of an electronic device. According to one embodiment, alternative image processing may analyze a first copy of a frame of raw image data before a second copy of the frame of raw image data is processed by main image processing. Thereafter, the main image processing may process the second copy of the frame of raw image. The main image processing may be calibrated based at least in part on the analysis of the first copy of the frame of raw image data. Such feed-forward processing techniques may be used for various image processing functions, including black level compensation, lens shading correction, and defective pixel mapping, for example.

Various refinements of the features noted above may exist in relation to the presently disclosed embodiments. Additional features may also be incorporated in these various embodiments as well. These refinements and additional features may exist individually or in any combination. For instance, various features discussed below in relation to one or more embodiments may be incorporated into other disclosed embodiments, either alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments relate to dual processing of raw image data by main image processing and alternative image processing capabilities of an electronic device. In some embodiments, this captured raw image data may be used to generate feed-forward control parameters for the main image processing, which may be an image signal processor (ISP). By way of example, periodically or on demand (e.g., when the main image processing is expected to be miscalibrated), certain alternative image processing may analyze the intercepted raw image data. Such alternative image processing may include, for example, a different ISP or software running on a general purpose processor. Based on the analysis of the raw image data, updated control parameters for controlling the main image processing may be developed and sent to the main image processing. Thereafter, the main image processing may process the raw image data according to these updated control parameters. For instance, such feed-forward control may be used with respect to one or more of black level compensation, lens shading compensation, or other corrective actions performed by the main image processing.

Certain embodiments may employ the captured raw image data for other purposes. For example, the raw image data may be analyzed periodically for new defective pixels, which may be difficult to detect after the raw image data has been processed by the main image processing. Also, in certain embodiments, the raw image data may be stored while main image processing occurs, to enable reprocessing by the alternative image processing if the main image processing produces an unsatisfactory image. In still other embodiments, the alternative image processing may process the raw image data in parallel with the main image processing to produce to images that may be selected by the user.

Figure 1:
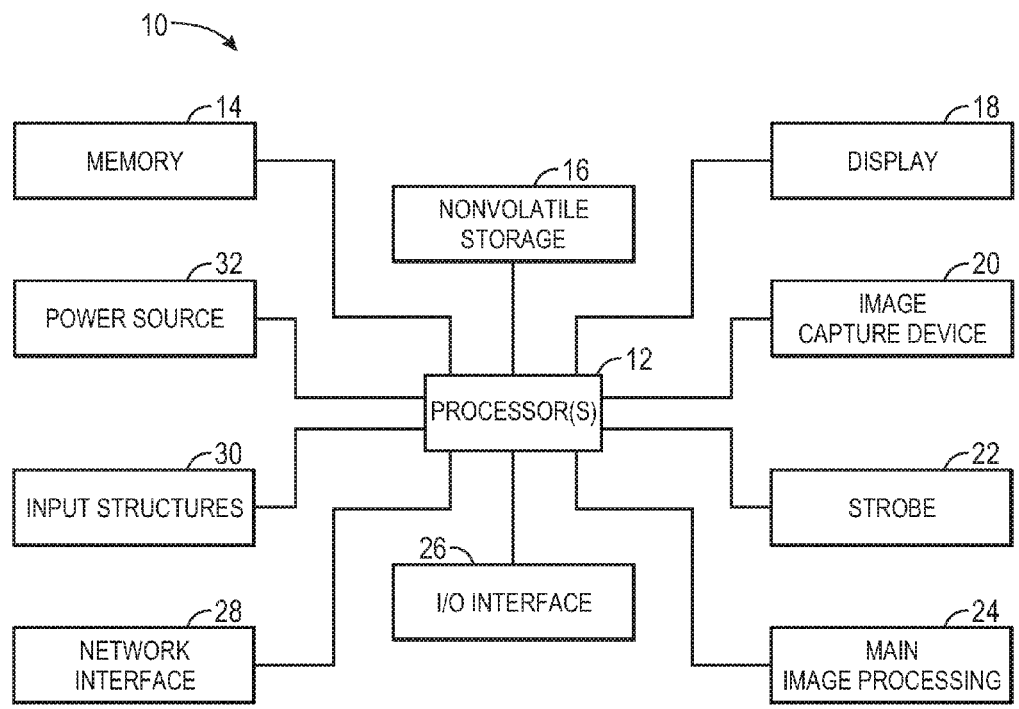
FIG. 1 is a block diagram of an electronic device capable of performing the techniques disclosed herein, in accordance with an embodiment.
Figure 2:
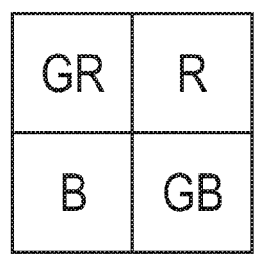
FIG. 2 is a graphical representation of a 2×2 pixel block of a Bayer color filter array that may be implemented in an image capture device of the electronic device of FIG. 1.
Figure 3:
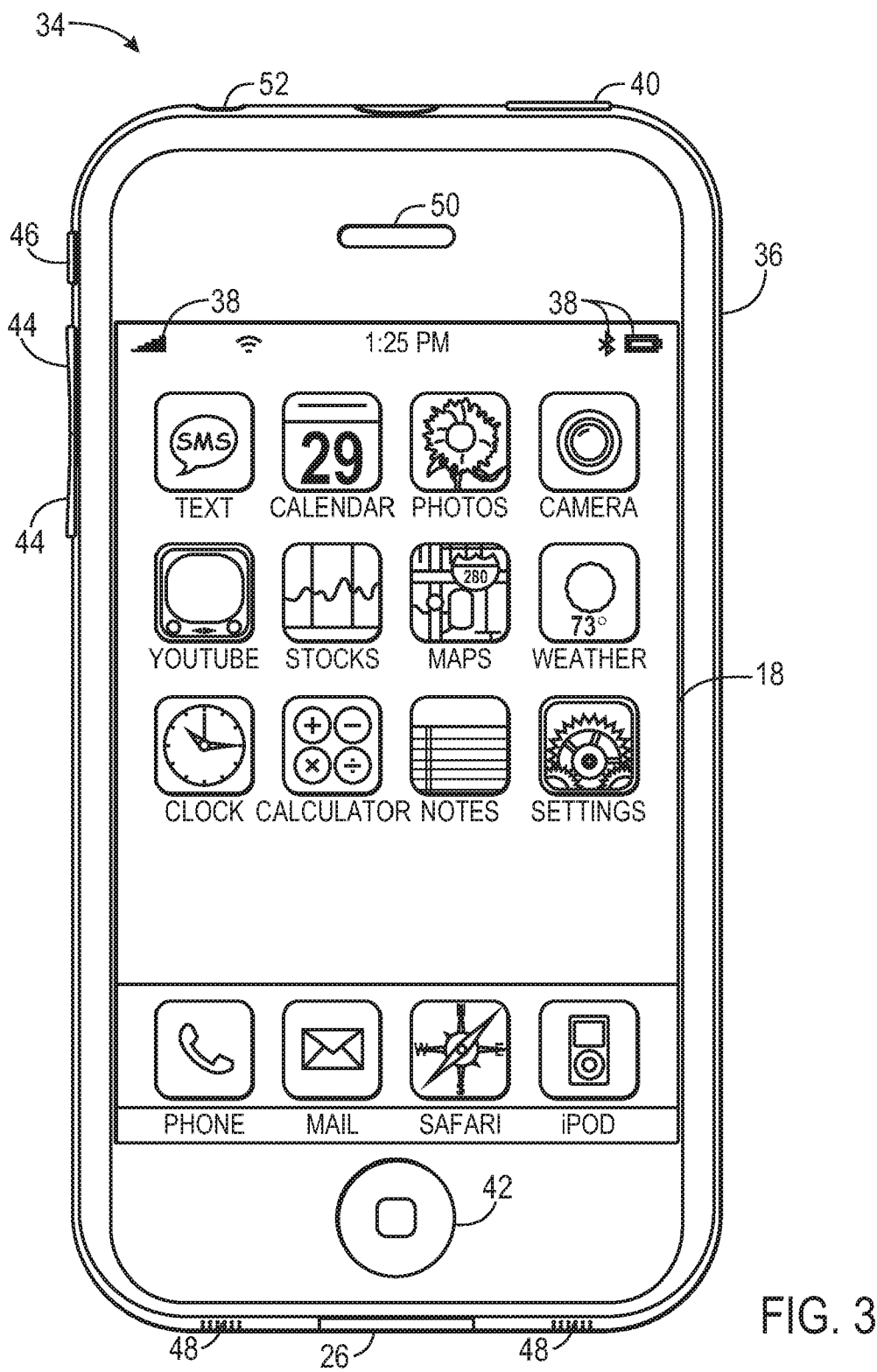
FIGS. 3 and 4 respectively represent front and back views of a handheld electronic device representing an embodiment of the electronic device of FIG. 1.

With the foregoing in mind, a general description of suitable electronic devices for performing the presently disclosed techniques is provided below. In particular, FIG. 1 is a block diagram depicting various components that may be present in an electronic device suitable for use with the present techniques. FIGS. 2 and 3 respectively represent front and back views of a suitable electronic device, which may be, as illustrated, a handheld electronic device having an image capture device, main image processing capabilities, and certain alternative image processing capabilities.

Turning first to FIG. 1, an electronic device 10 for performing the presently disclosed techniques may include, among other things, one or more processor(s) 12, memory 14, nonvolatile storage 16, a display 18, one or more image capture devices 20, a strobe 22, main image processing 24, an input/output (I/O) interface 26, network interfaces 28, input structures 30, and a power source 32. The various functional blocks shown in FIG. 1 may include hardware elements (including circuitry), software elements (including computer code stored on a non-transitory computer-readable medium) or a combination of both hardware and software elements. It should further be noted that FIG. 1 is merely one example of a particular implementation and is intended to illustrate the types of components that may be present in electronic device 10.

By way of example, the electronic device 10 may represent a block diagram of the handheld device depicted in FIG. 3 or similar devices, such as a desktop or notebook computer with similar imaging capabilities. It should be noted that the main image processing 24 block, the processor(s) 12, and/or other data processing circuitry generally may be referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within electronic device 10. Additionally or alternatively, the data processing circuitry may be partially embodied within electronic device 10 and partially embodied within another electronic device connected to device 10.

In the electronic device 10 of FIG. 1, the processor(s) 12 and/or other data processing circuitry may be operably coupled to the memory 14 and the nonvolatile storage 16 to perform various algorithms for carrying out the presently disclosed techniques. These algorithms may be performed by the processor(s) 12 and/or other data processing circuitry (e.g., firmware or software associated with the main image processing 24) based on certain instructions executable by the processor(s) 12 and/or other data processing circuitry. Such instructions may be stored using any suitable article(s) of manufacture that include one or more tangible, computer-readable media to at least collectively store the instructions. The article(s) of manufacture may include, for example, the memory 14 and/or the nonvolatile storage 16. The memory 14 and the nonvolatile storage 16 may include any suitable articles of manufacture for storing data and executable instructions, such as random-access memory, read-only memory, rewritable flash memory, hard drives, and optical discs.

The image capture device 20 may capture frames of raw image data of a scene, typically based on ambient light. When ambient light alone is insufficient, the strobe 22 (e.g., a light emitting diode (LED) or xenon strobe flash device) may temporarily illuminate the scene while the image capture device 20 captures a frame of raw image data. In either case, the frame of raw image data from the image capture device 20 may be processed before being stored in the memory 14 or nonvolatile storage 16 or displayed on the display 18.

In particular, the illustrated image capture device 20 may be provided as a digital camera configured to acquire both still images and moving images (e.g., video). Such an image capture device 20 may include a lens and one or more image sensors configured to capturing and converting light into electrical signals. By way of example only, the image sensor may include a CMOS image sensor (e.g., a CMOS active-pixel sensor (APS)) or a CCD (charge-coupled device) sensor. Generally, the image sensor in the image capture device 20 includes an integrated circuit having an array of pixels, wherein each pixel includes a photodetector for sensing light. As those skilled in the art will appreciate, the photodetectors in the imaging pixels generally detect the intensity of light captured via the camera lenses. However, photodetectors, by themselves, are generally unable to detect the wavelength of the captured light and, thus, are unable to determine color information.

Accordingly, the image sensor may further include a color filter array (CFA) that may overlay or be disposed over the pixel array of the image sensor to capture color information. The color filter array may include an array of small color filters, each of which may overlap a respective pixel of the image sensor and filter the captured light by wavelength. Thus, when used in conjunction, the color filter array and the photodetectors may provide both wavelength and intensity information with regard to light captured through the camera, which may be representative of a captured image.

In one embodiment, the color filter array may include a Bayer color filter array, which provides a filter pattern that is 50% green elements, 25% red elements, and 25% blue elements. For instance, FIG. 2 shows a 2×2 pixel block of a Bayer CFA includes 2 green elements (Gr and Gb), 1 red element (R), and 1 blue element (B). Thus, an image sensor that utilizes a Bayer color filter array may provide information regarding the intensity of the light received by the image capture device 20 at the green, red, and blue wavelengths, whereby each image pixel records only one of the three colors (RGB). This information, which may be referred to as "raw image data" or data in the "raw domain," may then be processed using one or more demosaicing techniques to convert the raw image data into a full color image, generally by interpolating a set of red, green, and blue values for each pixel. As discussed below, such demosaicing techniques may be performed by the main image processing 24.

Frames of such raw image data from the image capture device 20 may enter the main image processing 24 for processing. In some embodiments, the main image processing 24 may include a dedicated hardware image processing pipeline, which may include an image signal processor (ISP) available from Samsung. As will be discussed below, the raw image data from the image capture device 20 also may be stored in a framebuffer in the memory 14 accessible to an alternative image processing capability of the electronic device 10. As used herein, the term "alternative image processing" denotes image processing performed apart from the main image processing 24, and includes image processing performed instead of, or in addition to, processing at the main image processing 24. Consequently, the term also includes processing performed outside of, but in support of, processing of image data by the main image processing 24, as described in various examples herein.

Such an alternative image processing capability of the electronic device 10 may include, for example, image processing or image analysis running in software on the processor(s) 12. Additionally or alternatively, the alternative image processing capability of the electronic device 10 may include other hardware or firmware capable of analyzing the raw image data for certain characteristics. By way of example, the alternative image processing capability may include a frame analysis, which may involve analyzing a frame of raw image data from the image capture device 20. This frame analysis may indicate certain characteristics of the raw image data that could impact how the raw image data should be processed by the main image processing 24.

Thus, in some embodiments, the alternative image processing capability of the electronic device 10 may produce certain feed-forward control parameters for the main image processing 24. In particular, periodically or on demand—such as when certain stages of the main image processing 24 are expected to be miscalibrated—the frame analysis of the alternative image processing may be performed on the raw image data. Based on the frame analysis, certain main image processing 24 control parameters may be developed and provided to the main image processing 24. Thereafter, the main image processing 24 may process the same raw image data according to the newly determined control parameters. As will be discussed in greater detail below, these control parameters may include, for example, parameters for black level and/or lens shading corrections that may take place early in the main image processing 24.

The I/O interface 26 may enable electronic device 10 to interface with various other electronic devices, as may the network interfaces 28. These network interfaces 28 may include, for example, interfaces for a personal area network (PAN), such as a Bluetooth network, interfaces for a local area network (LAN), such as an 802.11x Wi-Fi network, and/or interfaces for a wide area network (WAN), such as a 3G or 4G cellular network. Through the network interfaces 28, the electronic device 10 may interface with other devices that may include a strobe 22. The input structures 30 of the electronic device 10 may enable a user to interact with the electronic device 10 (e.g., pressing a physical or virtual button to initiate an image capture sequence). The power source 32 of the electronic device 10 may be any suitable source of power, such as a rechargeable lithium polymer (Li-poly) battery and/or an alternating current (AC) power converter.

Figure 4:
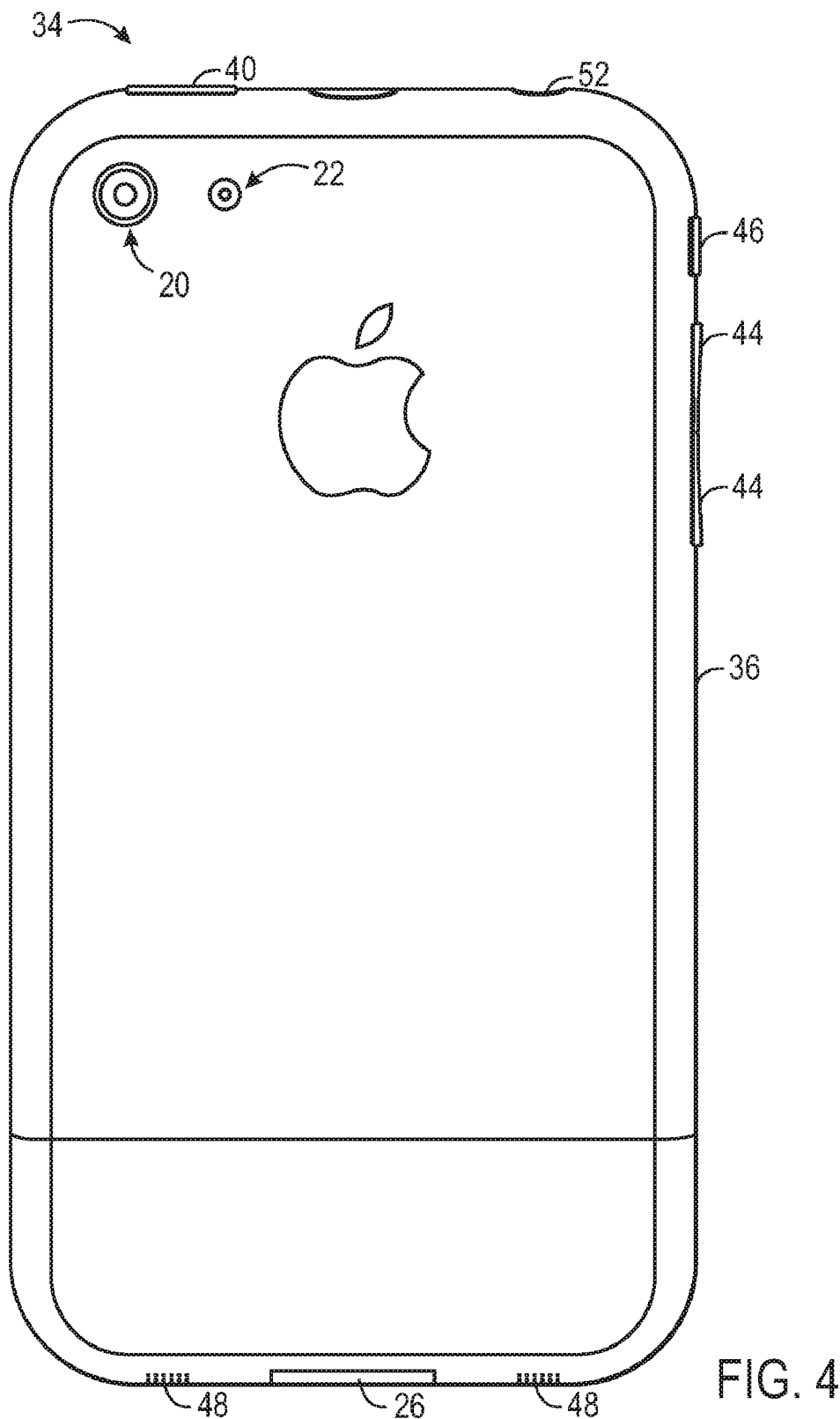

FIGS. 3 and 4 depict front and back views of a handheld device 34 and represent one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif. It should be understood that other embodiments of the electronic device 10 may include, for example, a computer such as a MacBook®, MacBook® Pro, MacBook Air®, iMac®, Mac® mini, or Mac Pro® available from Apple Inc. In other embodiments, the electronic device 10 may be a tablet computing device, such as an iPad® available from Apple Inc.

The handheld device 34 may include an enclosure 36 to protect interior components from physical damage and to shield them from electromagnetic interference. The enclosure 36 may surround the display 18, which may display indicator icons 38. The indicator icons 38 may indicate, among other things, a cellular signal strength, Bluetooth connection, and/or battery life. The I/O interfaces 26 may open through the enclosure 36 and may include, for example, a proprietary I/O port from Apple Inc. to connect to external devices. As indicated in FIG. 4, the reverse side of the handheld device 34 may include the image capture device 20 and the strobe 22.

User input structures 40, 42, 44, and 46, in combination with the display 18, may allow a user to control the handheld device 34. For example, the input structure 40 may activate or deactivate the handheld device 34, the input structure 42 may navigate user interface 20 to a home screen, a user-configurable application screen, and/or activate a voice-recognition feature of the handheld device 34, the input structures 44 may provide volume control, and the input structure 46 may toggle between vibrate and ring modes. A microphone 48 may obtain a user's voice for various voice-related features, and a speaker 50 may enable audio playback and/or certain phone capabilities. Headphone input 52 may provide a connection to external speakers and/or headphones.

Figure 5:
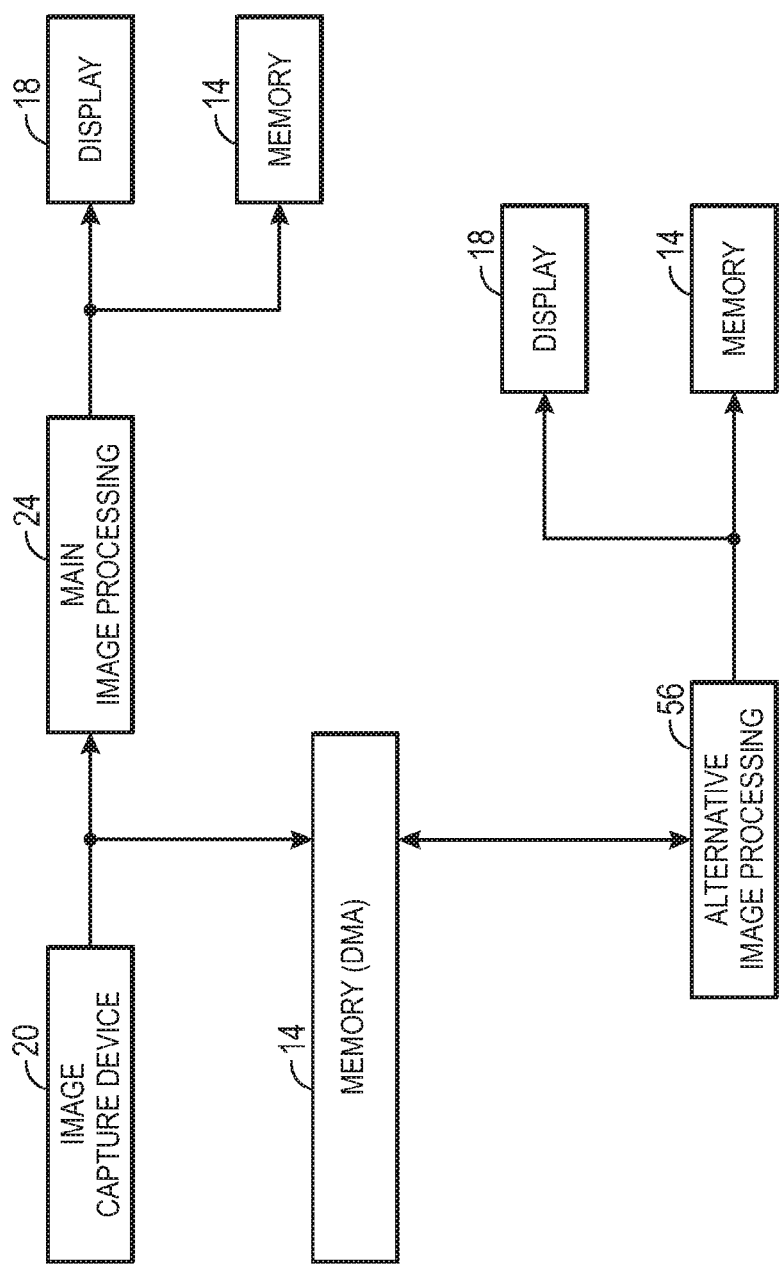
FIG. 5 is a schematic block diagram of image processing that may take place using the electronic device of FIG. 1, in accordance with an embodiment.

When the image capture device 20 of the electronic device 10 captures raw image data, this raw image data may be provided to the main image processing 24 before a final image is displayed on the display 18 or stored in the memory 14, as shown in FIG. 5. However, periodically or when certain stages of the main image processing 24 are expected to be miscalibrated, the raw image data also may be stored in the memory 14. The memory 14 in which the raw image data may be stored may be part of main memory of the electronic device 10, nonvolatile storage 16, or may be a separate dedicated memory within the electronic device 10. This memory 14 in which the raw image data may be stored may include direct memory access (DMA) features. For example, a controller associated with the image capture device 20, the image processing circuitry 24, or the memory 14 may cause certain frames of raw image data from the image capture device 20 to be stored in the memory 14 on demand. Alternative image processing 56 (FIG. 4), which may include, for example, image processing or image analysis software running on the processor(s) 12, or other hardware or firmware with certain image analysis capabilities, thereafter may access the raw image data stored in memory 14. Alternatively, each new frame of raw image data from the image capture device 20 may be sent to the memory 14, but only may be accessed by the alternative image processing 56 on demand.

The alternative image processing 56 may be distinct from the main image processing 24. For example, as mentioned above, the main image processing 24 may include hardware image processing and the alternative image processing 56 may include software image processing. In other words, the main image processing 24 may take place via a first processor, such as an image signal processor (ISP), and the alternative image processing 56 may take place via a second processor, such a general purpose processor or certain processing unit (CPU). In some embodiments, the alternative image processing 56 may be an alternative hardware image processing pipeline, which may have different capabilities or which may operate according to different control parameters from that of the main image processing 24.

In addition, the main image processing 24 and the alternative image processing 56 may have different capabilities. In some embodiments, the main image processing 24 may be more efficient, but the alternative image processing 56 may be more flexible. When the main image processing 24 includes a hardware image processing pipeline such as image signal processor (ISP) and the alternative image processing 56 includes software image processing running on one or more of the processor(s) 12, the main image processing 24 may consume fewer resources than the alternative image processing 56. Thus, the main image processing 24 typically may be a first choice for image processing in the electronic device 10. However, because the capabilities of the main image processing 24 may be limited and/or occasionally miscalibrated, the increased consumption of resources of the alternative image processing 56 may be warranted at times. On the other hand, when the alternative image processing 56 includes software, the alternative image processing 56 may have access to more image processing techniques and/or greater memory than the main image processing 24. Thus, periodically or when certain stages of the main image processing 24 are expected to be miscalibrated, the alternative image processing 56 may use these resources to analyze a frame of the raw image data before the main image processing 24 processes the frame of raw image data. From such an analysis, the alternative image processing 56 and/or the main image processing 24 may develop feed-forward parameters to control certain aspects of the main image processing 24. Since the feed-forward control parameters are determined based on the same raw image data that is going to be processed by the main image processing 24, these feed-forward control parameters may be more accurate than feedback control parameters based on previous frames of image data.

As mentioned above, the alternative image processing 56 may perform a pre-analysis of the raw image data before the raw image data is processed by the main image processing 24. Based on such a pre-analysis of the raw image data, certain control parameters for the main image processing 24 may be developed. Additionally or alternatively, the alternative image processing 56 may process the raw image data to produce a final, processed image when the main image processing 24 produces or is expected to produce unsatisfactory results. Specifically, since the alternative image processing 56 may offer a different final image from the main image processing 24, the alternative image processing 56 may be used when the main image processing 24 is unable to produce a satisfactory final processed image. Thus, when the main image processing 24 is expected to produce an unsatisfactory processed image, the alternative image processing 56 may process the raw image data instead of or in addition to the main image processing 24. Similarly, when the main image processing 24 yields an unsatisfactory final image, the alternative image processing 56 may be used to reprocess the raw image data to produce a new final image. Accordingly, in some embodiments, the results of the alternative image processing 56 may be stored in the memory 14 or displayed on the display 18.

Figure 6:
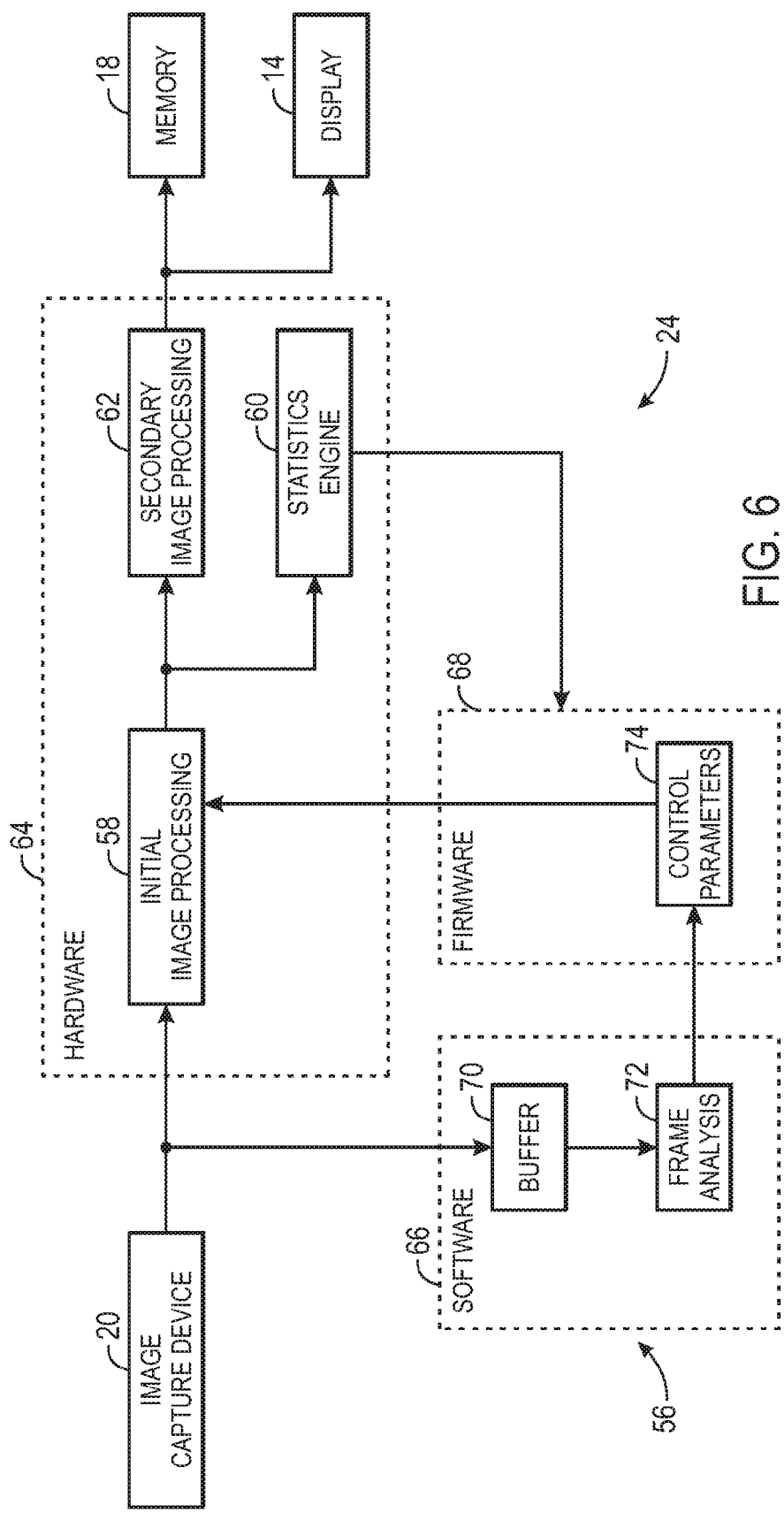
FIG. 6 is another schematic block diagram of image processing that may take place within the electronic device of FIG. 1, in accordance with an embodiment.

As shown in FIG. 6, in certain embodiments, the main image processing 24 may include initial image processing 58, an image statistics engine 60, and secondary image processing 62. These elements 58-62 of the main image processing 24 and the image capture device 20 may be implemented in hardware 64. In general, the initial image processing 58 may receive a frame of raw image data from the image capture device 20 to perform certain initial processing techniques, such as black level correction and lens shading correction. Once the initial image processing 58 has performed initial processing of the frame of image data, the statistics engine 60 may determine certain statistics relating to the current frame of image data. These statistics from the statistics engine 60 may be accessible to the hardware 64, software 66, and/or firmware 68. When the alternative image processing 56 is not in use, statistics gathered for the current frame of image data may be used (e.g., by the hardware 64 or the firmware 68) to determine control parameters for the initial image processing 58 of future frames of image data. Thus, because the initial image processing 58 may occur before image statistics for the current frame of image data can be collected from the statistics engine 60, when the alternative image processing 56 is not in use, the initial image processing 58 may generally be controlled at least partly based on feedback.

After the initial image processing 58, the secondary image processing 62 may perform subsequent image processing techniques. By way of example, the secondary image processing 62 may include, among other things, white balancing and demosaicing the current frame of image data. Because the secondary image processing 62 may take place after the image statistics can be determined by the statistics engine 60, the secondary image processing 62 may be controlled at least partly by control parameters developed based on the current frame of image data (e.g., using the hardware 64 or the firmware 68). In this way, the secondary image processing 62 may not rely on feedback from previously processed frames of image data in the same manner as the initial image processing 58.

Periodically, or when statistics from the statistics engine 60 indicate that a future frame of data may be miscalibrated in the initial image processing 58, the alternative image processing 56 may be used. In the embodiment illustrated by FIG. 6, the alternative image processing 56 is implemented in software 66. The software 66 may run on the processor(s) 12. When the software 66 is not in use, all or part of the processor(s) 12 may be at least partially deactivated, consuming very little power. In some embodiments, the software 66 may take advantage of certain general-purpose processor designs, such as certain reduced instruction set computing (RISC) architectures. By way of example, some embodiments may involve single instruction, multiple data (SIMD) architectures, such as the NEON™ architecture by ARM®, which may enable certain parallel image processing (e.g., parallel low pass filtering, etc.). The software 66 may interact with certain firmware 68 of the electronic device 10. By way of example, the firmware 68 may be associated with the main image processing 24.

As noted above, a frame of raw image data from the image capture device 20 may be sent to the memory 14. The software 66 may obtain this frame of raw image data from a buffer 70, which may occupy, in some embodiments, only enough memory for a single frame at a given time. A frame analysis 72 of the frame of raw image data may indicate whether the current control parameters for the main image processing 24 are properly calibrated. By way of example, as discussed in greater detail below, the frame analysis 72 may indicate that black level correction or lens shading correction control parameters of the initial image processing 58 should be changed. In certain embodiments, the frame analysis 72 may indicate that new defective pixels of the image capture device 20 have been detected. To make such determinations, any suitable manner of analyzing a frame of raw image data may be employed by the alternative image processing 56, including those described below.

Based on such information determined in the frame analysis 72, new or updated control parameters 74 associated with the main image processing 24 may be determined in the software 66 or the firmware 68. These "feed-forward" control parameters 74, determined before the initial image processing 58 begins processing the same frame of raw image data, may be fed forward to the main image processing 24. In the illustrated embodiment, the control parameters 74 are fed forward to the initial image processing 58. Thereafter, the various stages of the main image processing 24 may process the frame of raw image data to produce a final image. Such a final image resulting from the main image processing 24 may be displayed on the display 18 and/or stored in the memory 14.

Figure 7:
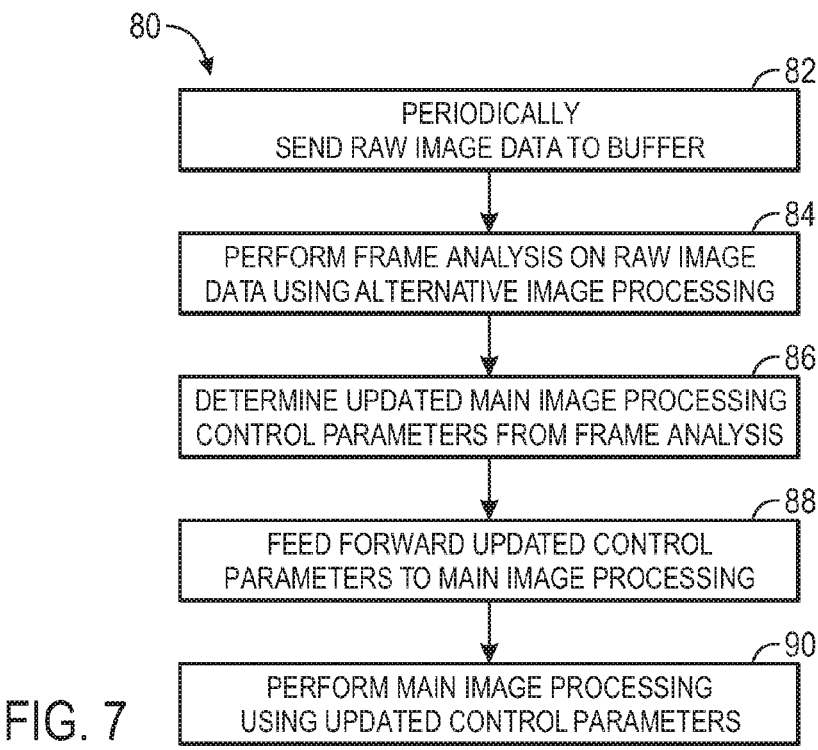
FIGS. 7 and 8 are flowcharts describing embodiments of methods for calibrating main image processing using raw image data analysis from alternative image processing.

As noted above, in certain embodiments, the alternative image processing 56 may analyze raw image data from the image capture device 20 on a periodic basis, enabling a periodic update of control parameters (e.g., the control parameters 74) associated with the main image processing 24. That is, as shown by a flowchart 80 of FIG. 7, the raw image data from the image capture device 20 may be sent to the memory 14 periodically (block 82). Additionally or alternatively, each frame of raw image data may be sent to the memory 14, but the alternative image processing 56 may only periodically access and process this raw image data stored in the memory 14. In some embodiments, the alternative image processing 56 may cause a frame of raw image data from the image capture device 20 to be stored in the memory 14 on a periodic basis.

The period for updating the main image processing 24 control parameters according to the flowchart 80 may depend on current conditions associated with the raw image data from the image capture circuitry 20. For example, the period may be longer when image statistics from the statistics engine 60 are relatively stable over a series of frames, and shorter when the statistics are changing. Because the alternative image processing 56 may consume more resources than the main image processing 24 alone, the period may be longer when power conservation is desired. The period also may change depending on the current application of the image capture device 20. For example, the period may differ when the image capture device 20 is used to capture frames of image data for video as compared to collecting still images. In some embodiments, block 80 may take place when a user elects to capture a specific image (e.g., by pressing a button or making a selection on the display 18). In some embodiments, block 80 may take place when the strobe 22 outputs light and a strobe-illuminated image is taken, since the strobe-illuminated frame of image data may have very different statistics from previous, non-strobe-illuminated frames of image data.

The alternative image processing 56 next may perform a frame analysis of the raw image data (block 84). As should be appreciated, this frame analysis may take place via software 66, as illustrated in FIG. 6, via firmware associated with the alternative image processing 56, or via hardware processing associated with the alternative image processing 56. Thereafter, the alternative image processing 56 or other data processing circuitry (e.g., firmware associated with the main image processing 24) may determine updated control parameters for the main image processing 24 that may be particularly suited to processing the current frame of raw image data (block 86). By way of example, the updated control parameters may represent one or more updated black level correction parameters, lens shading correction parameters, and/or defective pixel mapping parameters. Any other parameters for controlling the main image processing 24 that may be ascertained from the raw image data may also be determined.

These updated main image processing 24 control parameters may be fed forward to the main image processing 24 (block 88). Thereafter, the main image processing 24 may carry out the main image processing 24 according to the updated control parameters (block 90). In some embodiments, the updated control parameters may remain in place until the alternative image processing 56 again periodically analyzes a new frame of raw image data to obtain newly updated control parameters. In other embodiments, the updated control parameters may be subject to traditional feedback control based at least partly on feedback from image statistics from the statistics engine 60.

Figure 8:
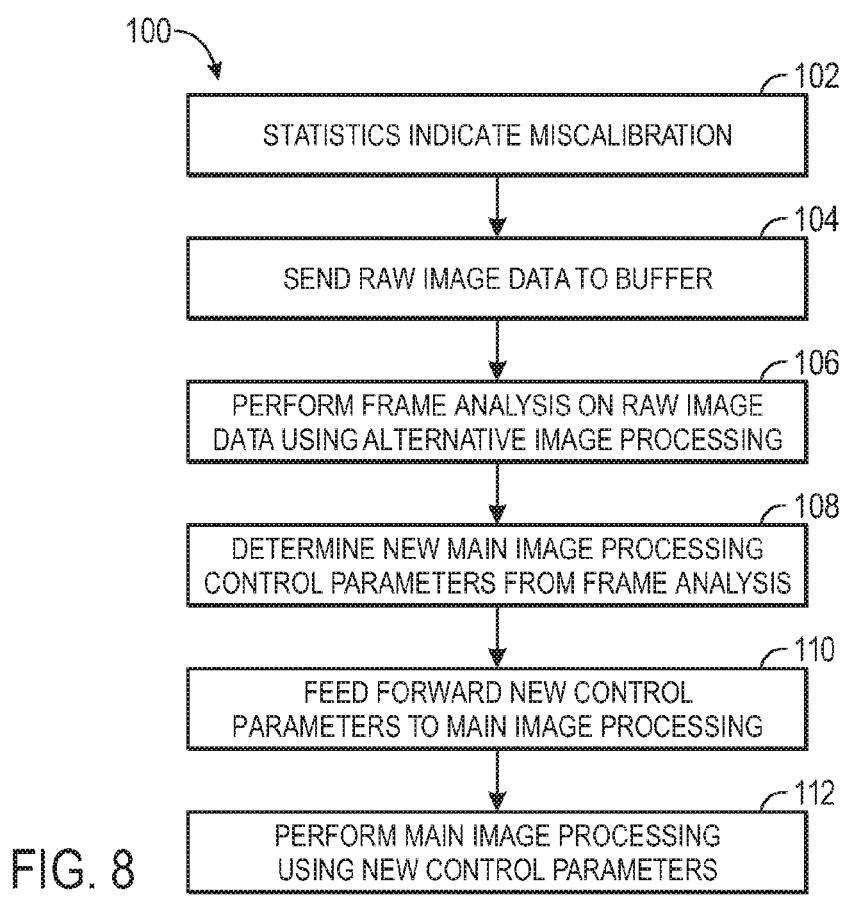

Additionally or alternatively, the alternative image processing 56 may analyze raw image data from the image capture device 20 on demand to obtain new main image processing 24 control parameters, such as when the main image processing 24 is expected to be miscalibrated. For example, as shown by a flowchart 100 of FIG. 8, when the main image processing 24 is expected to be miscalibrated for the current frame of raw image data (e.g., statistics from the statistics engine 60 may indicate that subsequent frames of image data may not be processed correctly by the main image processing 24) (block 102), the raw image data from the image capture device 20 may be sent to the memory 14 (block 104). Additionally or alternatively, each frame of raw image data may be sent to the memory 14, but the alternative image processing 56 may only access and process the raw image data stored in the memory 14 when the main image processing 24 is expected to be miscalibrated. In some embodiments, the alternative image processing 56 may cause a frame of raw image data from the image capture device 20 to be stored in the memory 14 when the main image processing 24 is expected to be miscalibrated.

The main image processing 24 may be expected to be miscalibrated, for example, when certain statistics from the statistics engine 60 vary from frame to frame. Such a frame-to-frame variance may indicate that feedback to certain stages of the main image processing 24 (e.g., the initial image processing 58) may be unstable and oscillating, or may be imprecise. The main image processing 24 also may be expected to be miscalibrated when a strobe-illuminated image is expected to be obtained by the image capture device 20. That is, light from the strobe 22 may be output only during one frame of raw image data. Accordingly, the light from the strobe 22 will not have been accounted for in statistics associated with previous frames. For this reason, among others, feedback alone might not properly calibrate the initial image processing 58 of the main image processing 24 when a strobe flash is obtained.

The alternative image processing 56 next may perform a frame analysis of the raw image data (block 106). As should be appreciated, this frame analysis may take place via software 66, as illustrated in FIG. 6, via firmware associated with the alternative image processing 56, or via hardware processing associated with the alternative image processing 56. Thereafter, the alternative image processing 56 or other data processing circuitry (e.g., firmware associated with the main image processing 24) may determine new control parameters for the main image processing 24 that may be particularly suited to processing the current frame of raw image data (block 108). By way of example, the updated control parameters may represent one or more updated black level correction parameters, lens shading correction parameters, and/or defective pixel mapping parameters. Any other parameters for controlling the main image processing 24 that may be ascertained from the raw image data may also be determined.

These new, frame-specific main image processing 24 control parameters may be fed forward to the main image processing 24 (block 110). Thereafter, the main image processing 24 may carry out the main image processing 24 according to the new control parameters (block 112). In the manner of embodiments discussed above, the new control parameters may remain in place until the alternative image processing 56 again analyzes a new frame of raw image data to obtain further new control parameters. In other embodiments, the new control parameters may be subject to traditional feedback control based at least partly on feedback from image statistics from the statistics engine 60.

As previously noted, the foregoing techniques may be applied to various aspects of an image processing system. By way of example, a system 114 for processing image data is provided in FIG. 9 in accordance with one embodiment. The system 114 may include an image sensor 116 (e.g., a Bayer sensor of image capture device 20) having a pixel array 118. The pixel array 118 may include imaging pixels 120 configured to receive light, and to generate electrical signals in response to such received light. In addition to the signals generated based on the received light, however, leakage current within the image sensor 118 may induce additional signal components. To compensate for the leakage-current induced signals, the pixel array 118 may also include dark pixels 122. The dark pixels 122 may be implemented at various locations within the pixel array 118, such as along some (or all) of the periphery of the imaging pixels 120.

The dark pixels 122 may be structurally similar to the imaging pixels 120, but the pixel array 118 may be configured to generally prevent the dark pixels 122 from receiving light. Consequently, signals generated by the dark pixels 122 are generally attributable to leakage current within the image sensor and provide a black level reference for the imaging pixels 120. Using this black level reference, the image sensor 116 may be configured to provide some amount of on-sensor black level compensation by reducing the output signals for the imaging pixels 120 of the image sensor 116 by the black level reference from the dark pixels 122. Thus, the output signal for an imaging pixel 120 may be described as:

$$S = S(i_{ph}) + [S(i_{dc}) - S_{dp}] + \text{data\_pedestal},$$

where S is the output signal, $S(i_{ph})$ is the light-induced signal component, $S(i_{dc})$ is the leakage-current induced signal component, $S_{dp}$ is the black level reference from the dark pixels 122, and "data_pedestal" is an offset added to the signal to prevent clipping sensor noise at the low signal end.

If the black level reference $S_{dp}$ from the dark pixels 122 matches the leakage-current induced signal component $S(i_{dc})$ from the imaging pixels 120, then the above formula for the output signal S reduces to the sum of the light-induced signal component $S(i_{ph})$ and the "data_pedestal" offset. In other cases, however, the black level reference $S_{dp}$ may not match the leakage-current induced signal component $S(i_{dc})$. For example, in some image sensors 116, the black level reference $S_{dp}$ may be greater than the leakage-current induced signal component $S(i_{dc})$, leading to overcompensation of the image black level by these sensors 116. Under at least certain lighting conditions, such as low light conditions, this overcompensation may produce an undesired color tint to the output image data. For instance, in an image with red, green, and blue color channels, the overcompensation of black level by the sensor 116 may have a larger impact on the weaker blue and red color channels and a lesser impact on the stronger green color channel, resulting in an image with a green tint. As used herein, the term "black level shift" refers to this overcompensation of black level by an image sensor. This black level shift may equal the black level reference $S_{dp}$ minus the leakage-current induced signal component $S(i_{dc})$ in at least some embodiments.

The system 114 may also include an image signal processing pipeline 124 including various hardware for processing and altering raw image data from the image sensor 116. In the presently illustrated embodiment, the pipeline 124 includes black level compensation block 126, which may provide an additional offset to remove the "data_pedestal" offset as well as provide further black level compensation, such as to correct for black level shift by the sensor 116. For instance, rather than simply removing the "data_pedestal" offset from the signal by reducing the signal by an equivalent additional offset in the black level compensation block 126, the additional offset amount by the black level compensation block 126 may be altered based on a measured black level shift in the image data to remove the black level shift. In other words, in some embodiments, the additional offset amount of black level compensation block may equal the "data_pedestal" minus the black level shift, and the image signal entering the black level compensation block 126 may be reduced by this additional offset amount to more accurately produce a desired signal.

The image signal processing pipeline 124 may also include additional processing blocks, such as a lens shading compensation block 128, a white balance compensation block 130, and a demosaic block 132. Additionally, the pipeline 124 may include a statistics engine 134 and any other desired processing blocks. In operation, raw image data from the image sensor 116 is processed by the pipeline 124 and the processed image data may be output to various locations, such as memory 14, some other memory (e.g., non-volatile storage 16), or the display 18.

The system 114 also includes a feed-forward loop 138 for adjusting a black level compensation parameter of the black level compensation block 126 in the pipeline 124. The feed-forward loop 138 (which may generally be correlated with the alternative image processing 56 discussed previously) may receive raw image data from the image sensor 116 and provide such data to additional image signal processing pipeline 140 via path 142. Although all frames of the raw image data could be provided to both pipeline 124 and pipeline 140, in at least some embodiments the image sensor 116 provides a sequence of image data frames to the pipeline 124, while only a subset of the sequence of frames is provided to the additional pipeline 140. This subset of the sequence of frames may be provided to the additional pipeline 140 on a periodic basis or on demand. Additionally, the one or more frames of the subset received and processed by the additional pipeline 140 may be referred to herein as "reference" frames. A reference frame may be copied into a buffer 144 and may undergo frame analysis 146, as described in greater detail below.

Further, the black level shifts for frames of image data may be determined at block 148 and used to adjust a black level compensation parameter (e.g., the additional offset discussed above) of black level compensation block 126 in the pipeline 124, as generally indicated by reference numeral 150. Such feed-forward compensation may allow for more accurate image compensation that accounts for variations in black level shift characteristics between different image sensors 116, as well as variations in black level shift in a particular sensor (e.g., due to aging effects, temperature, integration time, and gain, among others), independent of any factory calibration data (that may be less accurate over time or in certain operational situations).

Figure 10:
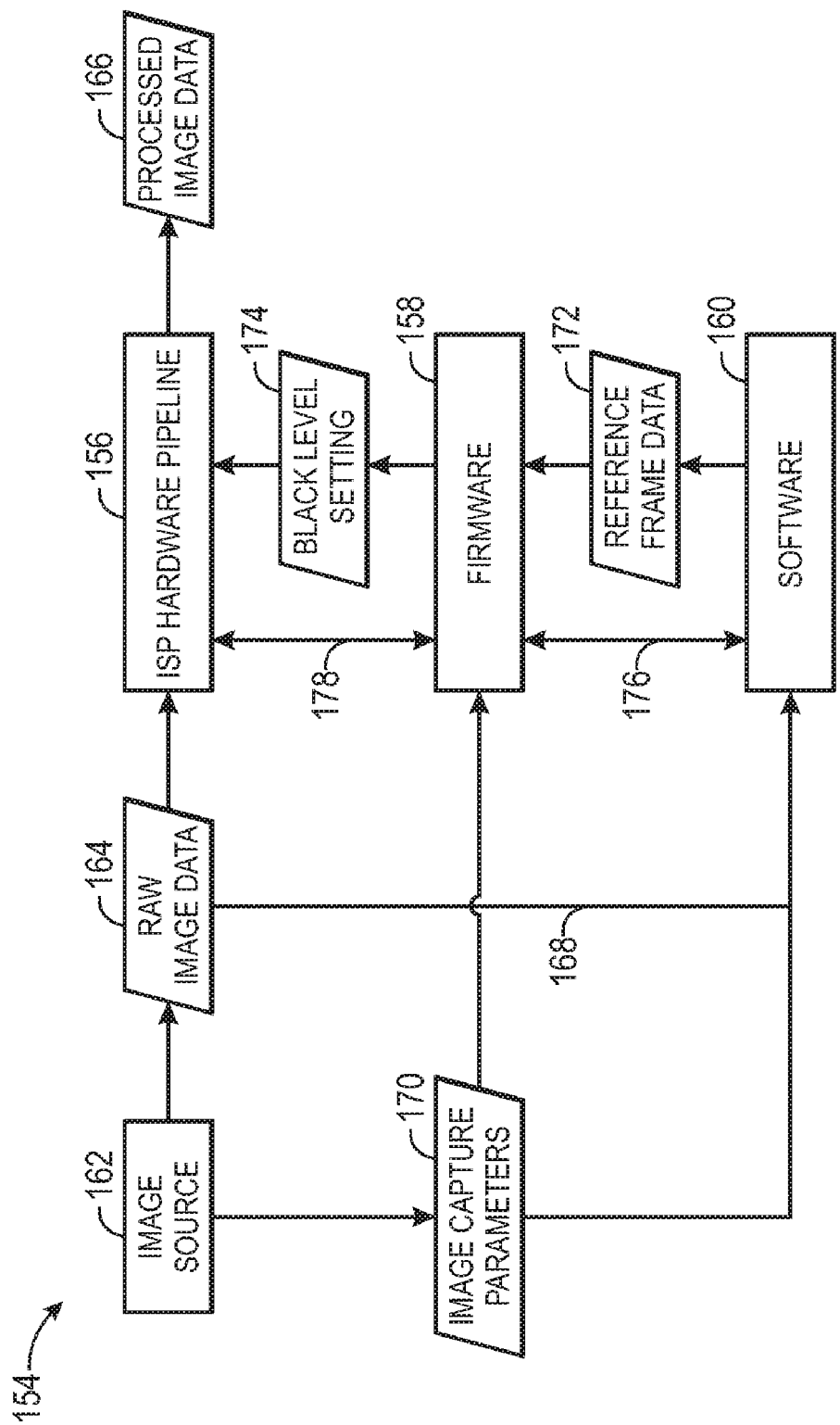
FIG. 10 generally illustrates a three-level architecture of the image processing system of FIG. 9, including software, firmware, and a hardware pipeline, in accordance with an embodiment.

In one embodiment, the system 114 may generally include a three-level architecture as depicted in block diagram 154 of FIG. 10. Particularly, in the depicted embodiment, the feed-forward black level compensation technique described above may be effected through use of an image signal processing hardware pipeline 156, firmware 158, and software 160. The image signal processing hardware pipeline 156 includes black level compensation block 126 and may be identical to, or different from, the pipeline 124 in other respects. The firmware 158 is associated with the hardware pipeline 156 and may be embodied by one or more memory devices (e.g., read-only memory) encoding various application instructions related to operation of the hardware pipeline 156. Software 160 may be encoded in any of various memories, such as random-access memory or non-volatile storage. Further, the software 160 may include a driver associated with hardware pipeline 156 and the firmware 158.

An image source 162 may provide raw image data 164 to the hardware pipeline 156. The pipeline 156 may process the raw image data 164, such as by applying various compensation techniques to the raw image data 164, to generate and output processed image data 166. The image source 162 may include the image capture device 20 (which may itself include the image sensor 116) or a memory device storing such data, such as the non-volatile storage 16.

In addition to frames of raw image data 164 being routed to the hardware pipeline 156, one or more of such frames may be provided as reference frames to the software 160 (via path 168) for analysis, as described in greater detail below. Image capture parameters, such as the exposure or integration time, the analog gain, or the temperature associated with a particular frame of raw image data 164 may be also provided to the software 160. The software 160 may conduct its analysis of the received raw image data frame and output a set of reference frame data 172 to the firmware 158. Subsequently, the firmware 158 may determine a black level compensation parameter or setting 174 and modify a black level compensation parameter (e.g., an offset amount to compensate for the "data_pedestal" and the black level shift) of the hardware pipeline 156 based on the determination. The determination of the black level setting 174 may be based on black level analysis conducted by the software 160, image capture parameters 170 for the frame of image data analyzed by the software 160, and image capture parameters 170 for a current frame of image data. Additional communications may be routed between the hardware pipeline 156, the firmware 158, and the software 160, as generally represented by reference numerals 176 and 178.

Figure 11:
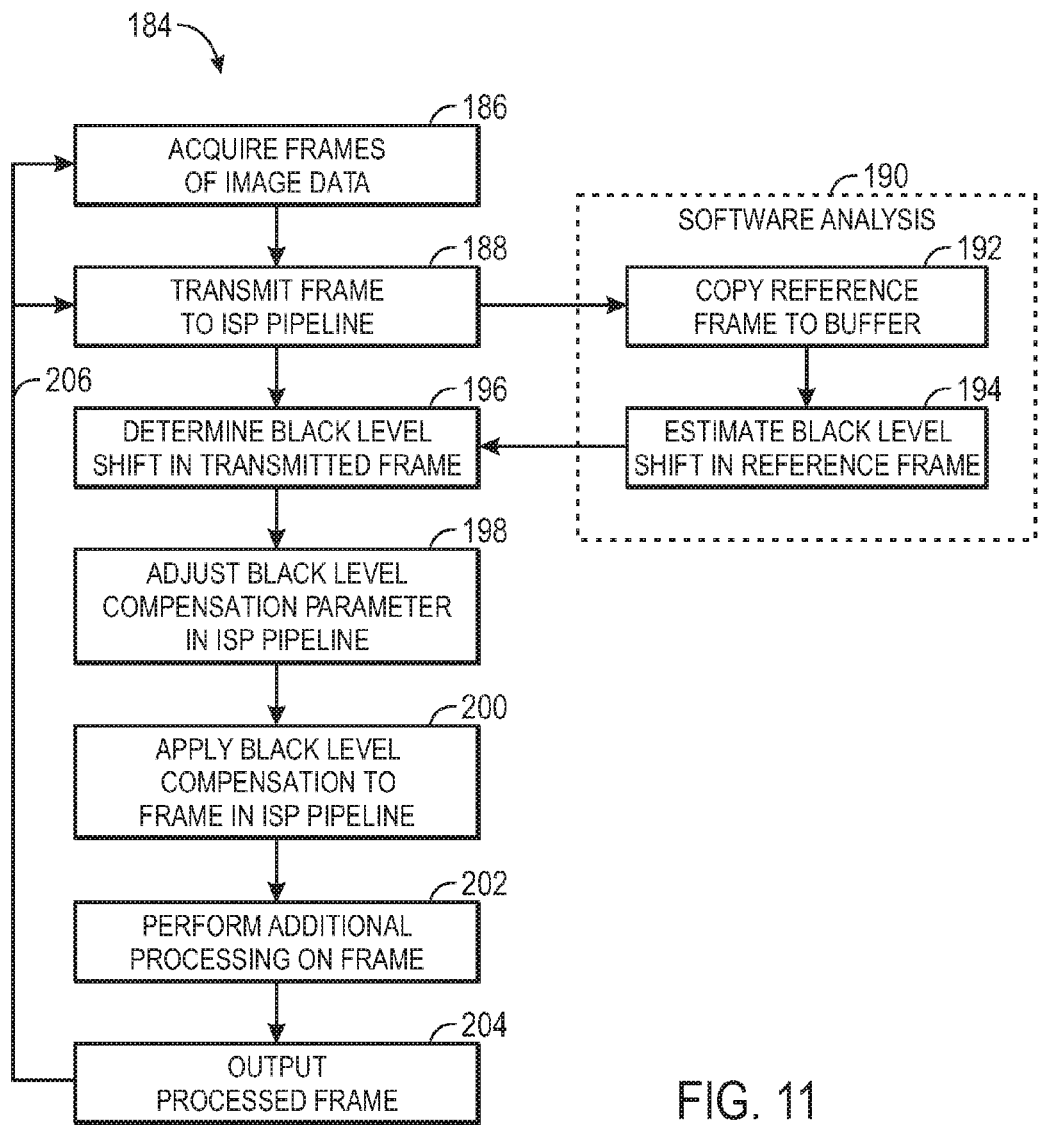
FIG. 11 is a flowchart indicative of a method for applying black level compensation to frames in accordance with one embodiment.

In one embodiment, the system 114 may generally operate in accordance with flowchart 184 depicted in FIG. 11. Frames and image data may be acquired and transmitted to an image signal processing hardware pipeline (e.g., pipeline 124) at blocks 186 and 188, respectively. As previously described, one or more of these frames transmitted at block 188 may be used as reference frames that undergo analysis by software 160, at block 190, to enable feed-forward black level compensation. Generally, such a reference frame may be copied to a buffer at block 192, and an estimated black level shift in the copied reference frame may be determined at block 194.

Based on this estimated black level shift in the reference frame, a black level shift in other transmitted frames may be determined at block 196. In at least some embodiments, the determination of the black level shift in the transmitted frames is performed by the firmware 158 based on one or more image capture parameters of both the reference frame and the transmitted frame (e.g., exposure time, gain, or temperature), as well as the estimated black level shift in the reference frame. At block 198, a black level compensation parameter in the image signal processing hardware pipeline 124 may be adjusted based on the black level shift determined in block 196, and the hardware pipeline 124 may apply black level compensation based on the adjusted parameter in block 200. Subsequently, additional processing (e.g., lens shading compensation and white balance compensation) may be performed on the frame at block 202 and the processed frame may be output (e.g., to memory or a display) at block 204. Additional transmitted frames may undergo similar black level compensation and additional processing, as generally indicated by reference numeral 206.

It is noted that, in some embodiments, the system 114 may determine the suitability of particular transmitted frames for selection and analysis as reference frames. For instance, if the system 114 determines that a particular transmitted frame includes parameters outside of a desired range (e.g., gain associated with the frame falls outside a desired range), the system 114 may decline to use the frame as a reference frame to avoid partially basing black level compensation of subsequently transmitted frames on the black level shift of an unsuitable reference frame. Accordingly, the process represented by flowchart 184 (or other processes described herein) may skip segments of the process or terminate mid-process if desired. For example, the software analysis 190 may terminate prior to block 194, or may not even begin for a particular frame, if the particular frame is determined to be unsuitable or undesirable as a reference frame.

Figure 12:
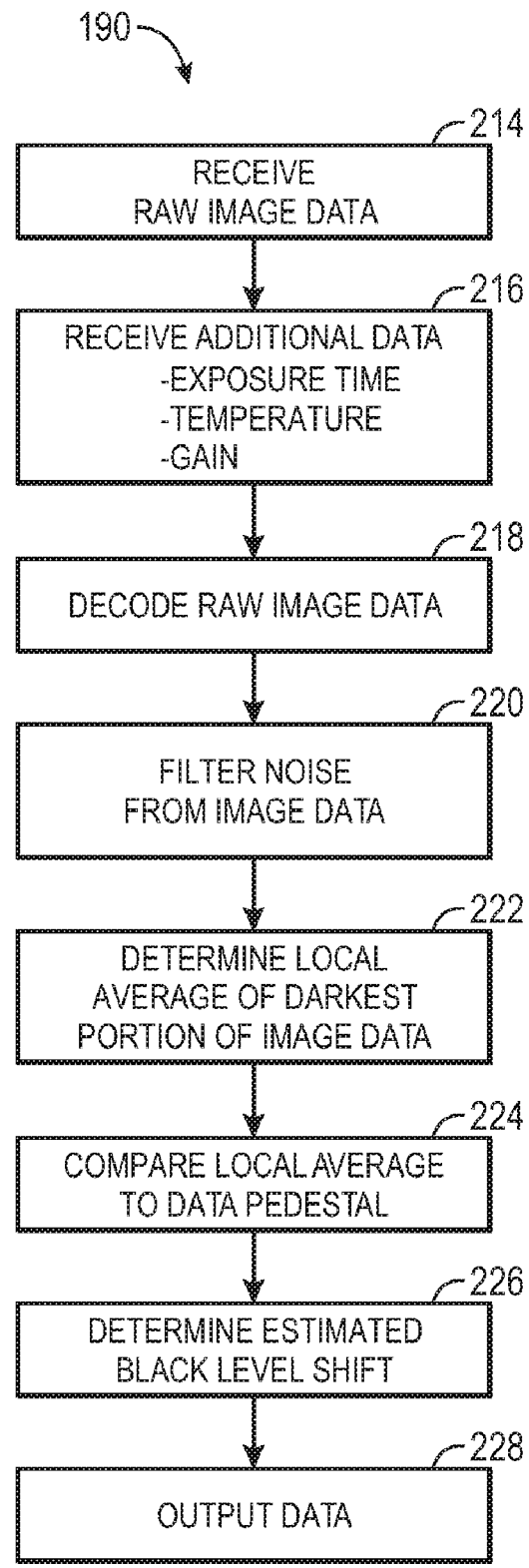
FIG. 12 is a flowchart for performing software analysis on a reference frame to determine an estimated black level shift in the image data of the reference frame in accordance with an embodiment.

The software analysis 190 of a reference frame may include additional aspects, such as those depicted in FIG. 12 in accordance with one embodiment. Raw image data may be received for software analysis at block 214, and additional data may be received at block 216. Non-limiting examples of such additional data include the exposure or integration time for the reference frame of raw image data, analog gain for the reference frame of raw image data, and a temperature associated with the capture of the reference frame by the image sensor 116 (e.g., the temperature of the sensor at the time of capture). Further, the received raw image data of the reference frame may be decoded at block 218 and noise may be filtered from such data at block 220.

Software analysis may be performed at block 222 to find the darkest portion or portions in the reference frame of image data and to determine the local average brightness level of such portions. It is noted that, as used herein, "dark" portions of the reference frame may include portions of the reference frame corresponding to black objects captured by the image, as well as portions corresponding to objects with saturated colors that appear to be black to certain pixels of one or more color channels (e.g., a saturated red object would appear to be black to any blue pixels in the image sensor 116). In at least some embodiments, one or more darkest regions may be found for each color channel (e.g., red, green, and blue color channels) of the reference frame, and local average brightness levels may be determined for the one or more darkest regions for each color channel. The local average brightness level or levels may then be compared to the "data_pedestal" (the offset applied to the raw image data by the image sensor 116 to reduce or avoid clipping) at block 224.

The software analysis may then determine a black level shift for the reference frame at block 226 based on the comparison of the local average brightness level of the darkest region or regions to the "data_pedestal". The determined black level shift may depend on the relative values of the local average brightness level and the "data_pedestal" compared at block 224. For instance, in one embodiment, block 226 may determine the estimated black level shift to be equal to the "dark_pedestal" minus the local average brightness level determined in block 222 if the local average brightness level is less than the "data_pedestal", otherwise the black level shift may be determined to be equal to zero (noting the impact of black level shift is reduced if the darkest region of an image remains at or above the "data_pedestal" offset). In such an embodiment, the "data_pedestal" generally provides a reference point to the local average brightness levels for the darkest portion of the image. In the case of complete darkness, the local average brightness level of the darkest region in the image should be equal to the "data_pedestal" offset applied by the sensor 116. Thus, deviation of the local average brightness level of the darkest region below the "data_pedestal" may be attributed to black level shift by the sensor 116. Reference data may also be output at block 228 for use in determining black level shift for additional frames. For example, the output reference data may include the estimated black level shift for the reference frame, as well as other statistics for the reference frame, such as exposure time, temperature, and gain.

Figure 13:
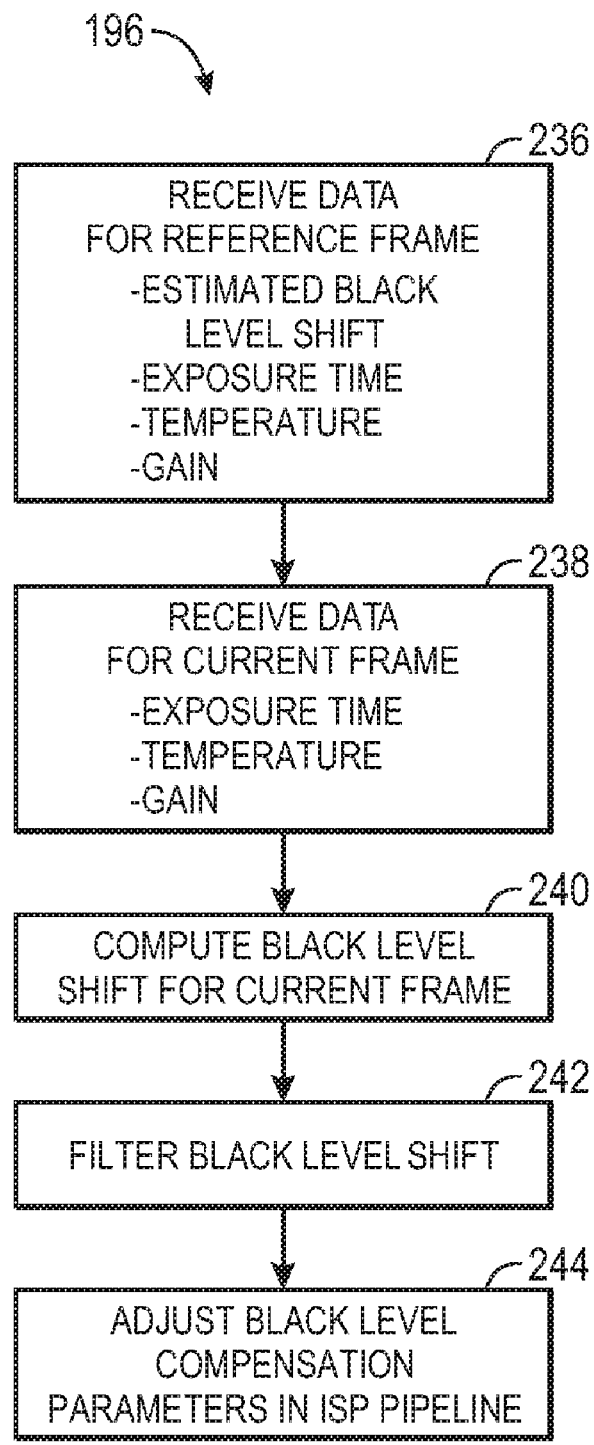
FIG. 13 is a flowchart for determining black level shift in additional frames based on the black level shift in the reference frame in accordance with one embodiment.

Additionally, the determination of a black level shift for frames transmitted to the hardware pipeline 124 may be better understood with reference to the flowchart depicted in FIG. 13 in accordance with one embodiment. The determination of a black level shift for each transmitted frame may be based on the reference frame data received at block 236 and additional data for the respective transmitted frame received at block 238. A black level shift for a current transmitted frame may be computed at block 240 based on the data received at blocks 236 and 238. For instance, as discussed above, the black level shift for the current frame may be determined through comparison of image capture statistics of the current frame (e.g., exposure time, gain, temperature, or some combination of these) to the estimated black level shift and image capture statistics of the reference frame. If the black level shift for the current frame computed at block 240 deviates greatly from that of the previous frame, the black level shift may be filtered at block 242 to reduce the magnitude of sudden large jumps between consecutive frames. Finally, the black level compensation parameter in the hardware pipeline 124 may be adjusted at block 244 for each frame such that the current frame undergoes black level compensation based on both data for the current transmitted frame itself, as well as data from the reference frame. As noted above, such black level compensation may be applied to remove the "data_pedestal" offset and the black level shift applied by the image sensor 116.

Figure 9:
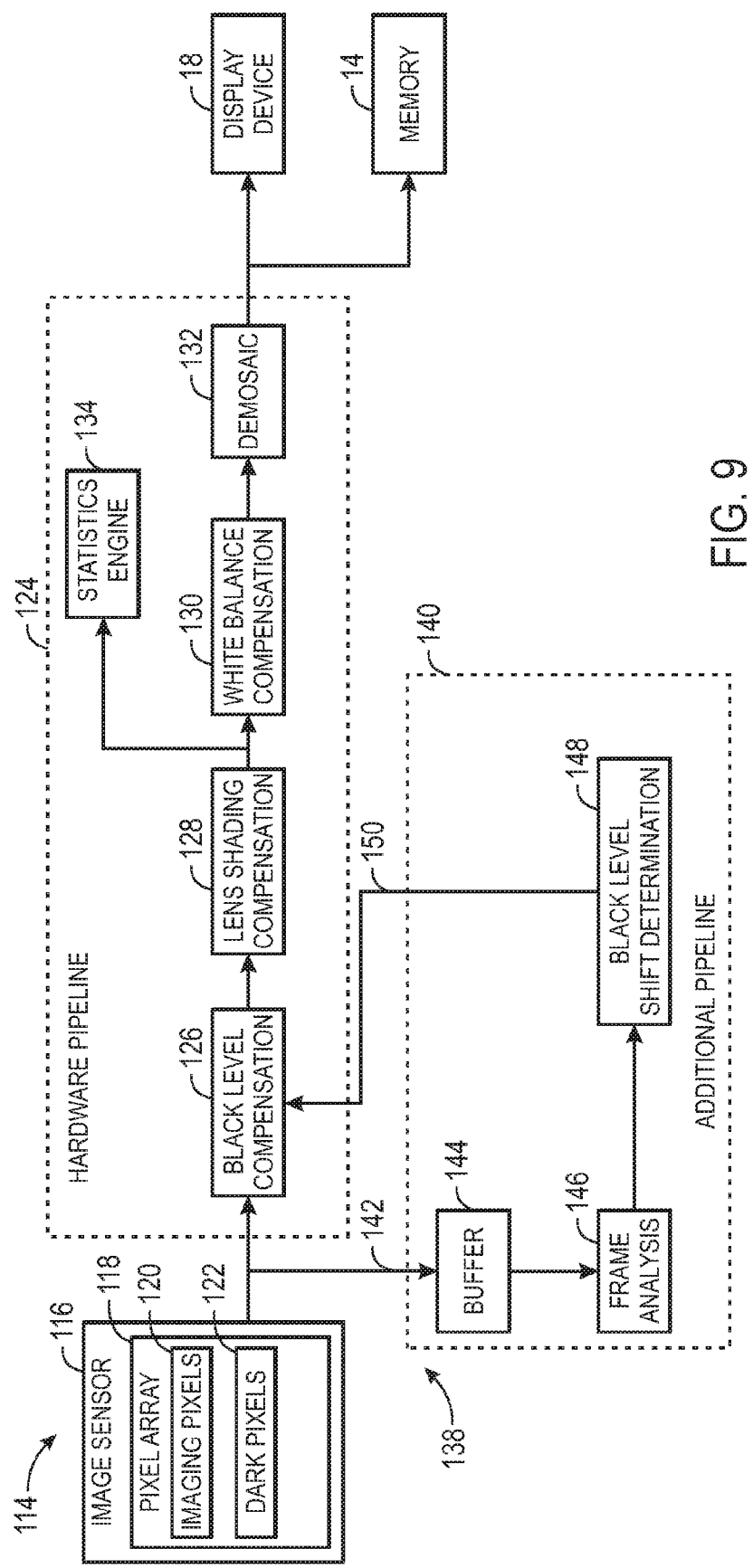
FIG. 9 depicts a block diagram of an image processing system for providing feed-forward black level compensation in accordance with an embodiment.

In another embodiment, the image processing system 114 may also provide feed-forward control parameters to the lens shading correction (LSC) logic 128 depicted in FIG. 9 to correct for lens shading artifacts. Various techniques for analyzing and determining control parameters that may be applied to the LSC logic 128 are described in detail below with respect to FIGS. 14-27.

As can be appreciated, lens shading artifacts may be caused by a number of factors, such as by irregularities in the optical properties of a lens associated with a digital image sensor. By way of example, a lens having ideal optical properties may be modeled as the fourth power of the cosine of the incident angle ($\cos^4(\theta)$), referred to as the $\cos^4$ law. However, because lens manufacturing does not always conform perfectly to the $\cos^4$ law, irregularities in the lens may cause the optical properties and response of light to deviate from the assumed $\cos^4$ model. For instance, the thinner edges of the lens (e.g., further away from the optical center) usually exhibit the most irregularities. Additionally, irregularities in lens shading patterns may also be the result of a micro-lens array not being properly aligned with a color filter array, which may be a Bayer pattern color filter array (FIG. 2) in one embodiment.

Figure 14:
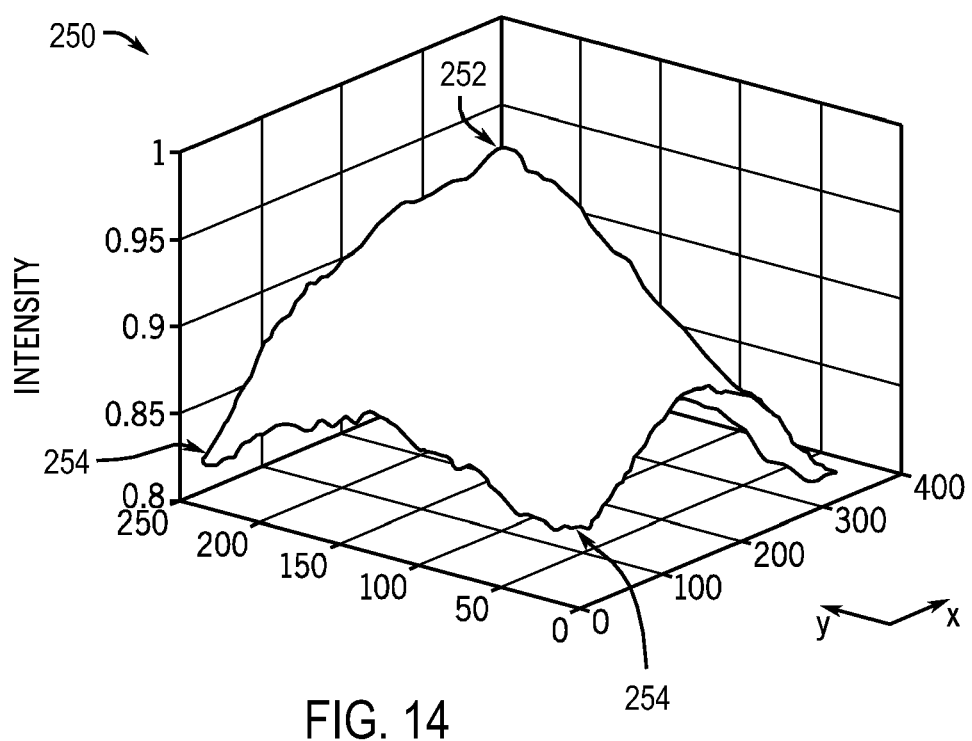
FIG. 14 shows a three-dimensional profile depicting light intensity versus pixel position for a conventional lens of an imaging device.

Referring to FIG. 14, a three-dimensional profile 250 depicting light intensity versus pixel position for a typical lens is illustrated. As shown, the light intensity near the center 252 of the lens gradually drops off towards the corners or edges 254 of the lens. In a digital image, this type of lens shading artifact may appear as drop-offs in light intensity towards the corners and edges of the image, such that the light intensity at the approximate center of the image appears to be brighter than the light intensity at the corners and/or edges of the image.

Figure 15:
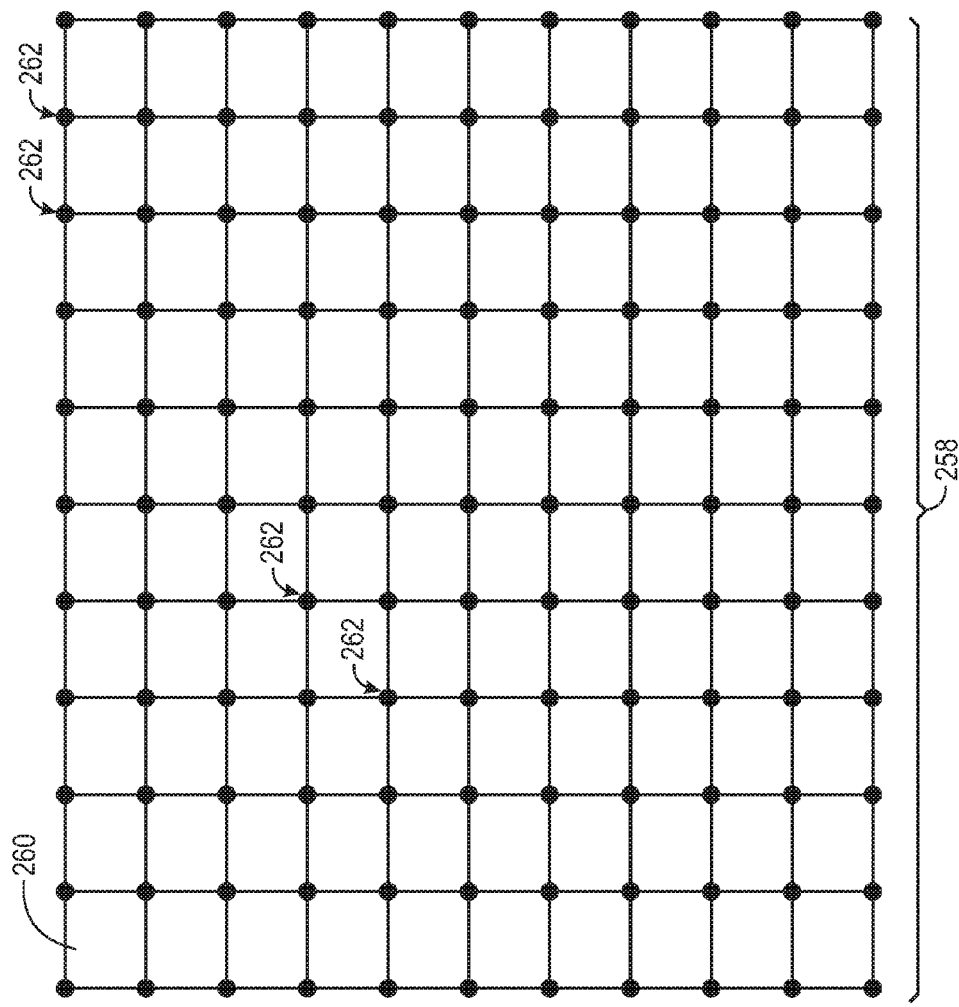
FIG. 15 shows a gain grid defining a set of lens shading gains.

In one embodiment, the LSC logic 128 may be configured to correct for lens shading artifacts by applying lens shading correction parameters in the form of an appropriate gain on a per-pixel basis to compensate for drop-offs in intensity, which are generally roughly proportional to the distance of a pixel from the optical center of the lens of the image capture device 20. For instance, the lens shading correction gains may be specified using a two-dimensional gain grid 258, as shown in FIG. 15. The grid 258 may overlay a frame of raw image data 260 and may include an arrangement of gain grid points 262 distributed at fixed horizontal and vertical intervals to overlay the frame 260. Lens shading gains for pixels that lie between grid points 262 may be determined by interpolating the gains associated with neighboring grid points 262. While the presently illustrated embodiment shows a gain grid 258 with 11×11 grid points (121 total grid points), it should be appreciated that any suitable number of grid points may be provided. In other embodiments, the gain grid 258 may include 15×15 grid points (225 total grid points), 17×17 grid points (289 total grid points), or 20×20 grid points (400 total grid points).

As will be appreciated, the number of pixels between each of the grid points 262 may depend on the number of grid points 262 in the gain grid 258, as well as the resolution of the image sensor 116. Further, while shown as being evenly spaced in both horizontal and vertical directions in FIG. 15, it should be appreciated that in some embodiments, the grid points 262 may be distributed unevenly (e.g., logarithmically), such that the grid points 262 are less concentrated in the center of the image frame 260 and more concentrated towards the corners and/or edges of the image frame 260, typically where lens shading distortion is more noticeable.

Figure 16:
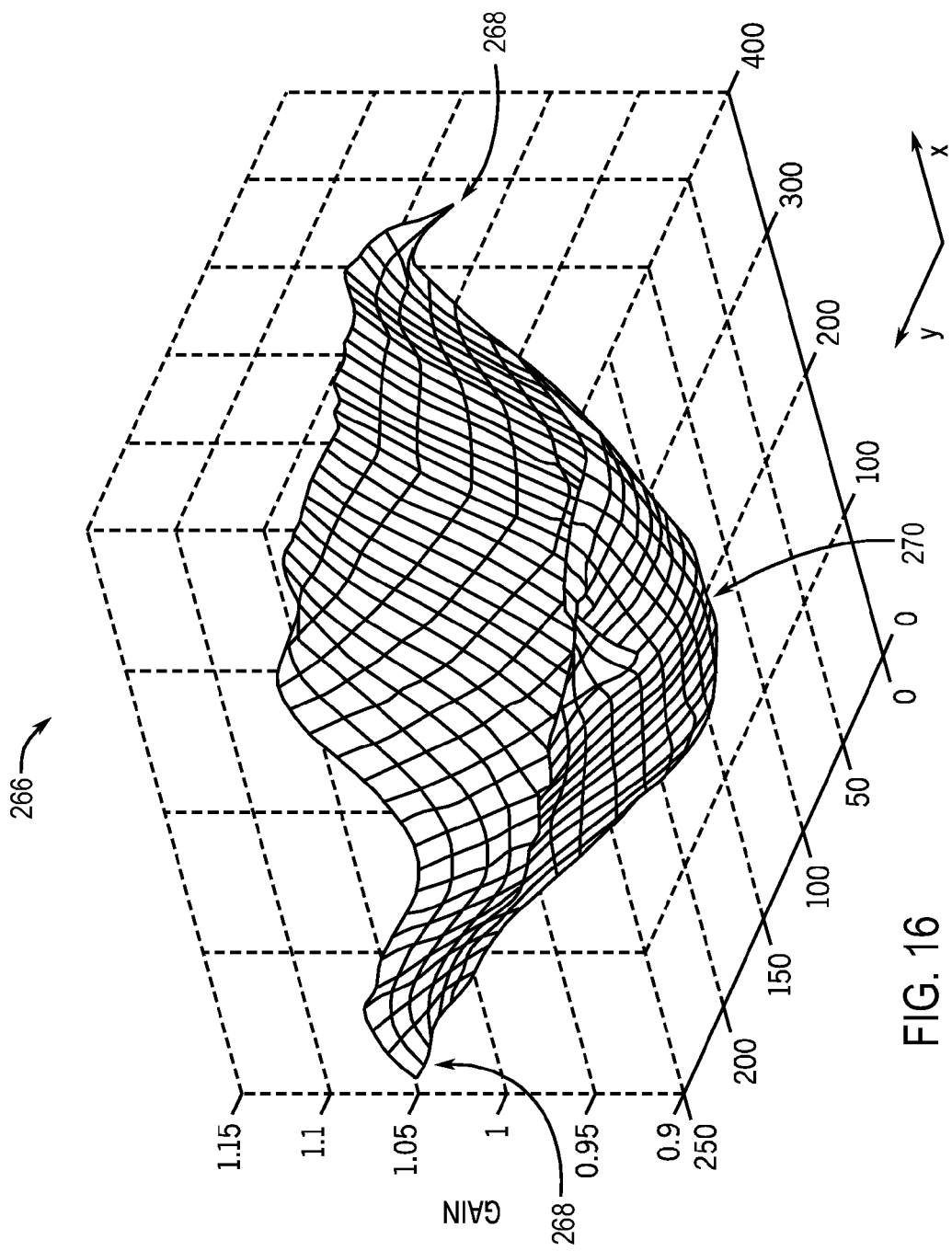
FIG. 16 is a three-dimensional profile depicting lens shading gain values that may be applied to an image that exhibits the light intensity characteristics shown in FIG. 14 when performing lens shading correction, in accordance with aspects of the present disclosure.

FIG. 16 depicts an example of a three-dimensional profile 266 illustrating gains that may be applied to each pixel position within the raw image frame 260 overlaid by the gain grid 258. As shown, the gains applied at the corners 268 of the image 260 may generally be greater than the gain applied to the center 270 of the image due to the greater drop-off in light intensity at the corners, as shown above in FIG. 14. By applying the appropriate lens shading gains to an image exhibiting lens shading artifacts, the appearance of light intensity drop-offs in the image may be reduced or substantially eliminated. For instance, the light intensity at the approximate center of the image may be substantially equal to the light intensity values at the corners and/or edges of the image. Additionally, in some embodiments, the lens of the image sensor 116 may include an infrared (IR) cutoff filter which may cause the drop-off to be illuminant-dependent (e.g., depending on the type of light source). Thus, as discussed further below, lens shading gains may also be adapted depending upon the light source detected.

With regard to the application of lens shading correction when the raw image data includes multiple color components, separate respective sets of gains may be provided for each color channel. In some instances, lens shading fall-off may be different for the color channels of a particular color filter array. For instance, in an image sensor that employs a Bayer color filter array, the raw image data may include red, blue, and green components. In such an embodiment, a set of lens shading gains may be provided for each of the R, B, Gr, and Gb color channels of the Bayer color filter array.

While the lens shading characteristics for each color channel may differ somewhat due to the difference in paths traveled by the varied wavelengths of light, in certain instances, the lens shading fall-off curves for each color channel may still have approximately the same shape. In some instances, however, additional factors may cause the response of one or more of the color channels to deviate further from the $\cos^4$ approximation than the other color channel(s). For example, in an embodiment where light entering the image capture device impinges the infrared (IR) cutoff filter and micro-lens array at steep angles, the response of the red color channel may deviate from the expected $\cos^4$ approximation curve significantly more than the blue and green channels under certain illuminants.

The amount of the deviation may depend in part on the amount of content in the 600-650 nanometer (nm) wavelengths. Thus, for narrow band fluorescent light sources having little to no energy in this band, the lens shading fall-off of the red channel may be very similar in shape when compared to the green and blue channels. For light sources similar to daylight, which has more energy in this 600-650 nm band, the lens shading fall-off of the red channel may exhibit a noticeable deviation. Further, when an IR-rich source, such as incandescent or halogen lighting, is provided, an even more significant deviation in the lens shading fall-off of the red channel may be present. This behavior of the red color channel may result in undesired color tinting artifacts under certain lighting conditions. Thus, when a lens shading corrections scheme modeled only upon the expected $\cos^4$ fall-off is applied, lens shading artifacts may still be present in situations where the illuminant contains notable amounts of energy in the 600-650 nm band.

Figure 17:
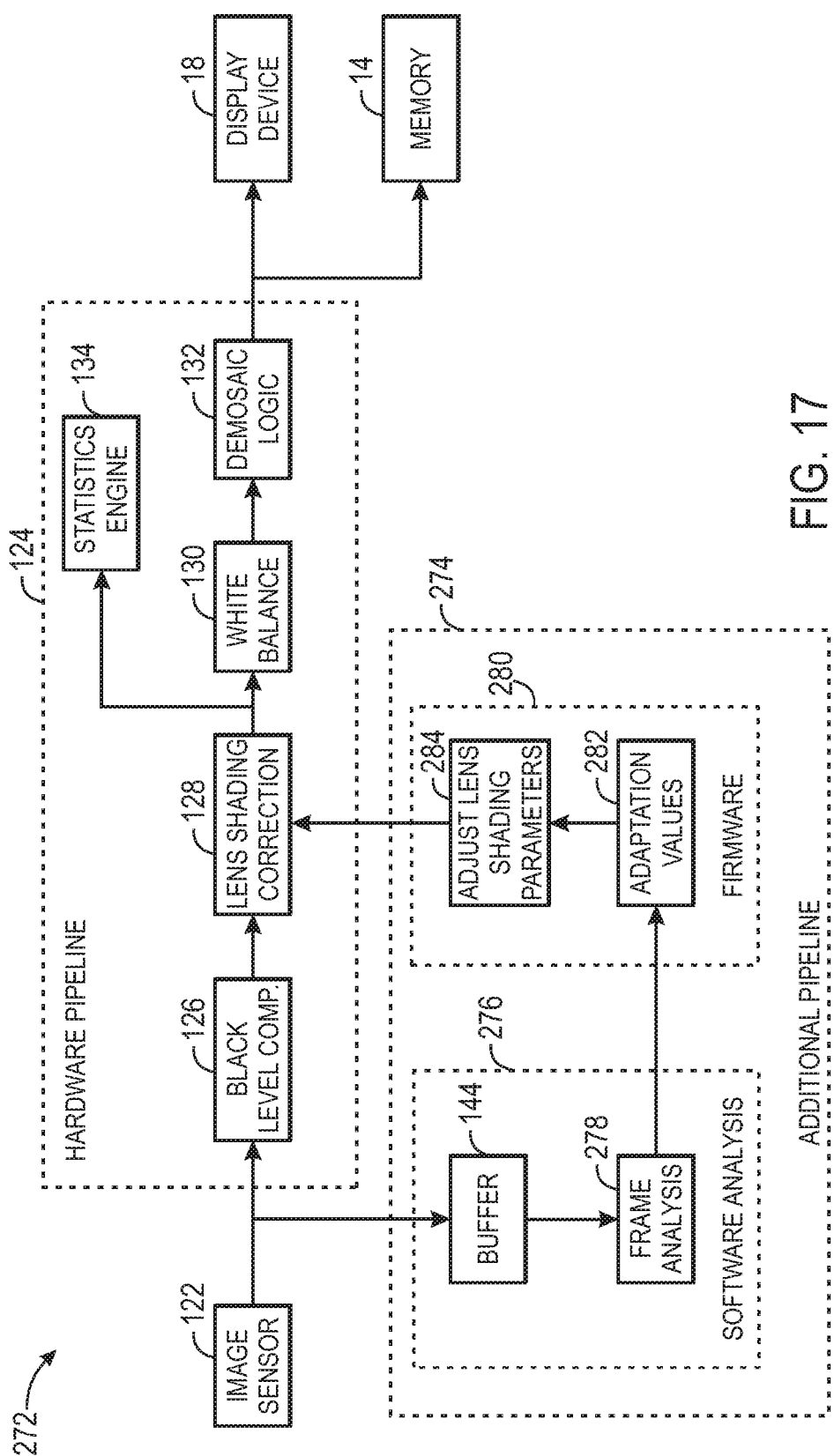
FIG. 17 is a block diagram illustrating an image signal processing (ISP) system that may be configured to apply lens shading correction in accordance with aspects of the present disclosure.
Figure 18:
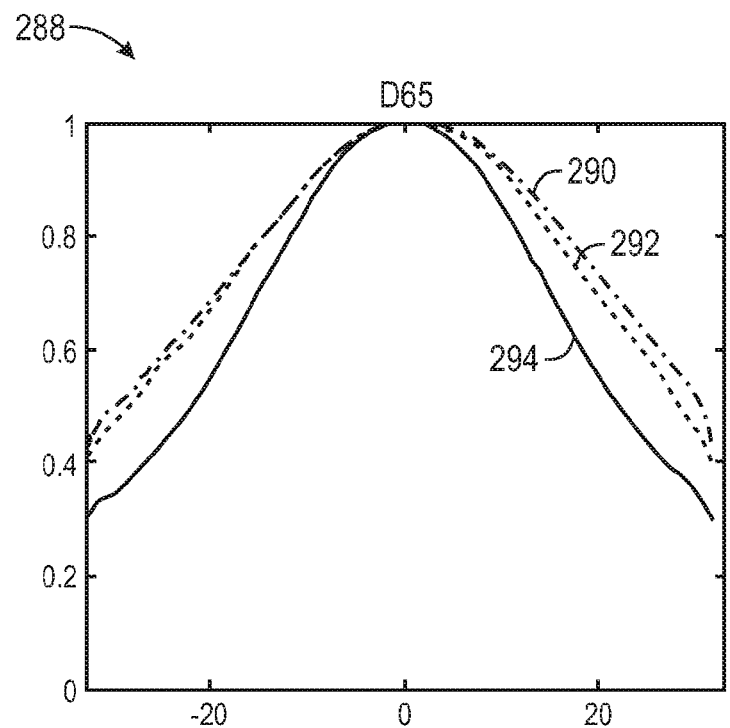
FIGS. 18-21 depict lens shading fall-off curves of red, blue, and green color channels for different types of reference illuminants.
Figure 19:
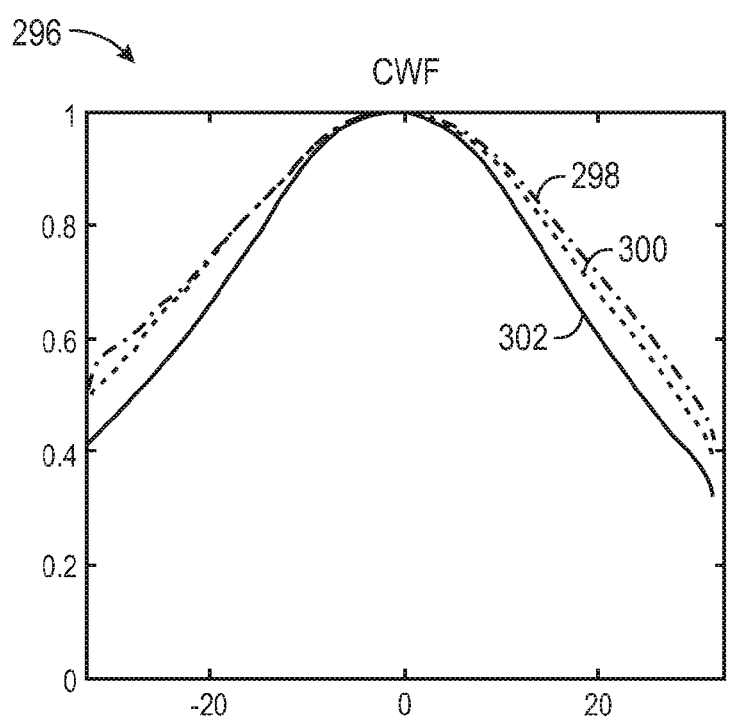
Figure 20:
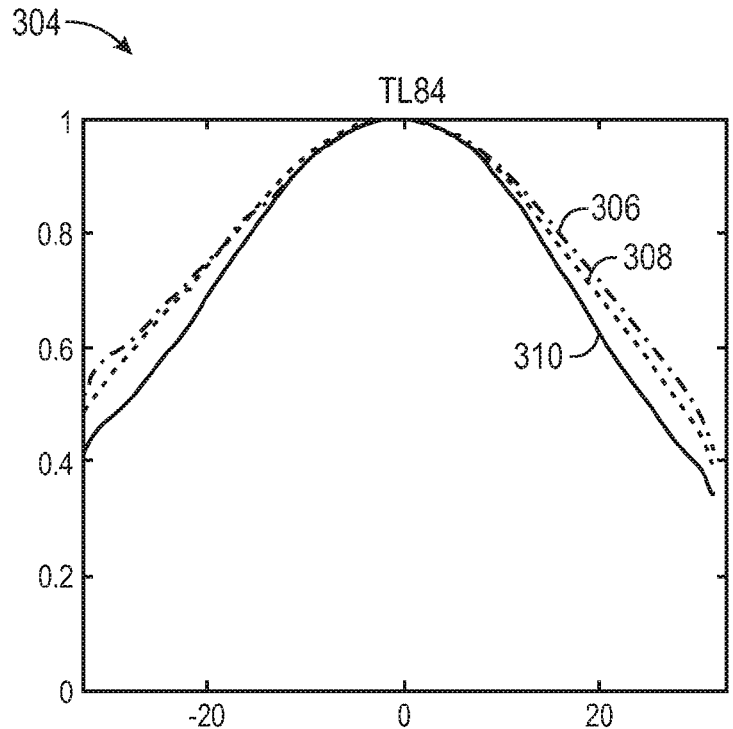
Figure 21:
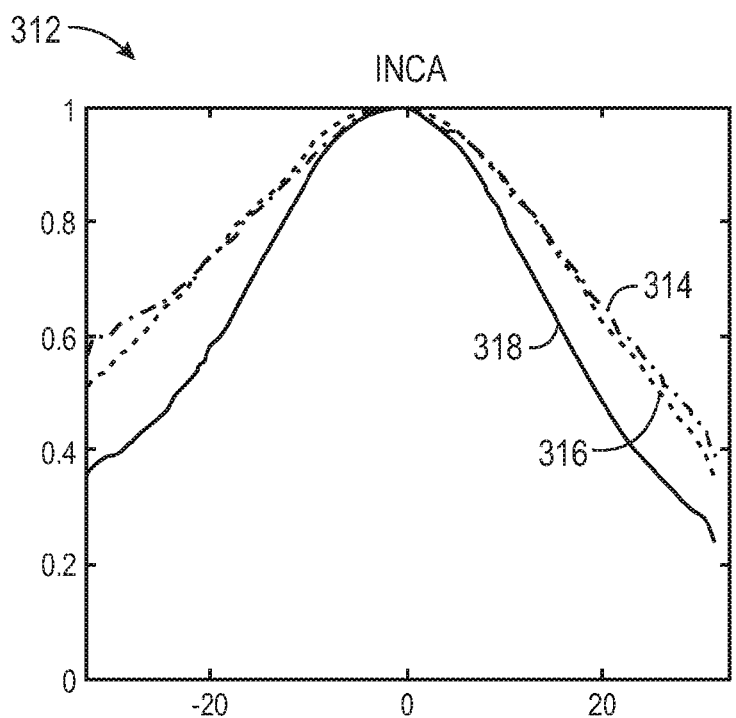

Referring to FIG. 17, a functional block diagram of an image signal processing (ISP) system 272 that is configured to analyze an image frame to derive feed-forward control parameters for adjusting lens shading parameters to correct the above-described lens shading artifacts due to the response of the red channel based on the IR content of an illuminant is illustrated in accordance with an embodiment. For simplicity, functional blocks already described above with reference to FIG. 9 have been numbered with like reference numerals.

The illustrated ISP system 272 includes the hardware pipeline 124 and the additional pipeline 274. As shown, additional pipeline 274 includes a software analysis block 276 that includes logic 278 configured to analyze a frame of raw image data captured by the buffer 144. In one embodiment, the capture of the raw image data may be triggered in an "on demand" manner based on a particular condition. For instance, in one embodiment, the capture and analysis of a frame of raw image data may be triggered upon detecting a change in auto-white balance, which may indicate a change in the light source.

As discussed further below, analysis of the captured frame, represented here by frame analysis logic 278, may include identifying generally neutral region(s) (e.g., regions having similar G/B ratio values) in the frame and applying each of a set of lens shading adaptation functions corresponding to each of a set of reference illuminants. The behavior of the color channels based on these reference illuminants may be modeled and characterized a priori by applying a uniform light field across several different illuminants, and modeling the ratio between them and that of a reference illuminant. For instance, referring to FIGS. 18-21, graphs showing the expected fall-off curves for each color channel based upon various reference illuminants are shown. Specifically, graph 288 depicts the fall-off curves 290, 292, and 294 for the blue, green, and red channels, respectively, based on the CIE standard illuminant D65, which is intended to simulate daylight conditions. Graph 296 depicts the fall-off curves 298, 300, and 302 for the blue, green, and red channels, respectively, based on a cool white fluorescent (CWF) reference illuminant. Additionally, graph 304 depicts the fall-off curves 306, 308, and 310 for the blue, green, and red channels, respectively, based on the TL84 reference illuminant (another fluorescent source). Further, graph 312 depicts the fall-off curves 314, 316, and 318 for the blue, green, and red channels, respectively, based on the IncA (or A) reference illuminant, which simulates incandescent lighting. As can be seen, under lighting conditions with greater amounts of energy in the 600-650 nm wavelengths, such as D65 and IncA reference illuminants, the shape of the lens shading response corresponding to the red channel (e.g., curves 294, 318) deviates more noticeably from the blue and green channels.

For each of the reference illuminants, a corresponding adaptation function may be derived. The adaptation functions may be determined by deriving a spatial adaptation curve for the red channel that is a fourth order polynomial function based on the distance from the optical center of the lens. In one embodiment, the goal is to model the adaption function so that the shape of the fall-off curve for the red channel matches that of the blue or green channel more closely. Since the response of the blue and green channels exhibit generally similar shapes, the adaptation functions may be derived by matching the green channel, the blue channel, or a combination (e.g., average) of the blue and green channels.

Figure 22:
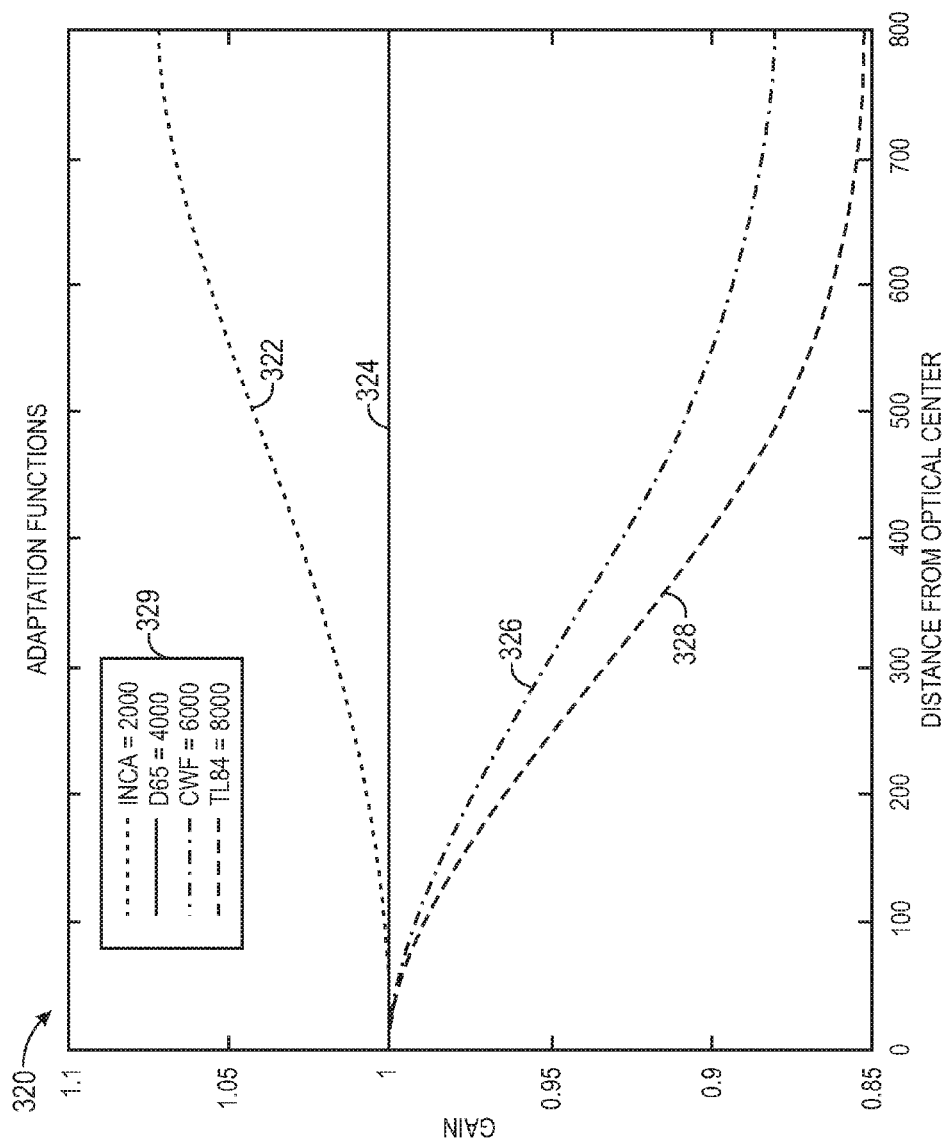
FIG. 22 is a graph depicting lens shading adaptation curves for each of the reference illuminants shown in FIGS. 18-21.

Referring to FIG. 22, a graph 320 showing adaption functions corresponding to each of the reference illuminants shown in FIGS. 18-21 are illustrated. For instance, the curves 322, 324, 326, and 328 correspond to the IncA, D65, CWF, and TL84 reference illuminants, respectively. As further shown, each curve may be associated with a value, as indicated by legend 329. As will be discussed further below, these values, which may be used to determine relative differences between each adaptation curve, may be used to provide gradual transitions between two lens shading profiles. In one embodiment, the values may at least approximately correspond to the correlated color temperature (CCT) of the corresponding reference illuminant.

Referring back to FIG. 17, the frame analysis logic 278 may analyze the captured frame and may select an appropriate adaptation function for correcting the red lens shading profile. As shown, adaptation values 284 corresponding to the selected adaptation function may be provided to firmware 280. The firmware 280 may then generate a corrected set of lens shading parameters 284, which may be provided as feed-forward parameters to the LSC logic 128. That is, the adaptation values 284 are used to modify the red lens shading parameters (e.g. gains) to account for artifacts that may occur due to the behavior of the red color channel under IR-rich illuminants. In certain embodiments, the lens shading parameters 284 and the adaptation values 282 corresponding to each adaptation function may be stored in look-up tables and/or in memory accessible by the software 276 and firmware 278.

As noted above, the ISP hardware pipeline 124 includes the statistics engine 134 and may include any other desired processing blocks. For instance, in one embodiment, the ISP hardware pipeline 124 may further include auto-exposure logic, auto-focus logic, and so forth. By processing the raw image data using these techniques, the resulting image may exhibit fewer or no lens shading or color tinting artifacts, and may be more aesthetically pleasing to a user viewing the image on the display 18 of the electronic device 10. Further, while the additional pipeline 274 is illustrated in FIG. 17 as software and firmware in the present embodiment, it should be understood that the present technique may be implemented using software, hardware, or a combination of software and hardware components.

Figure 23:
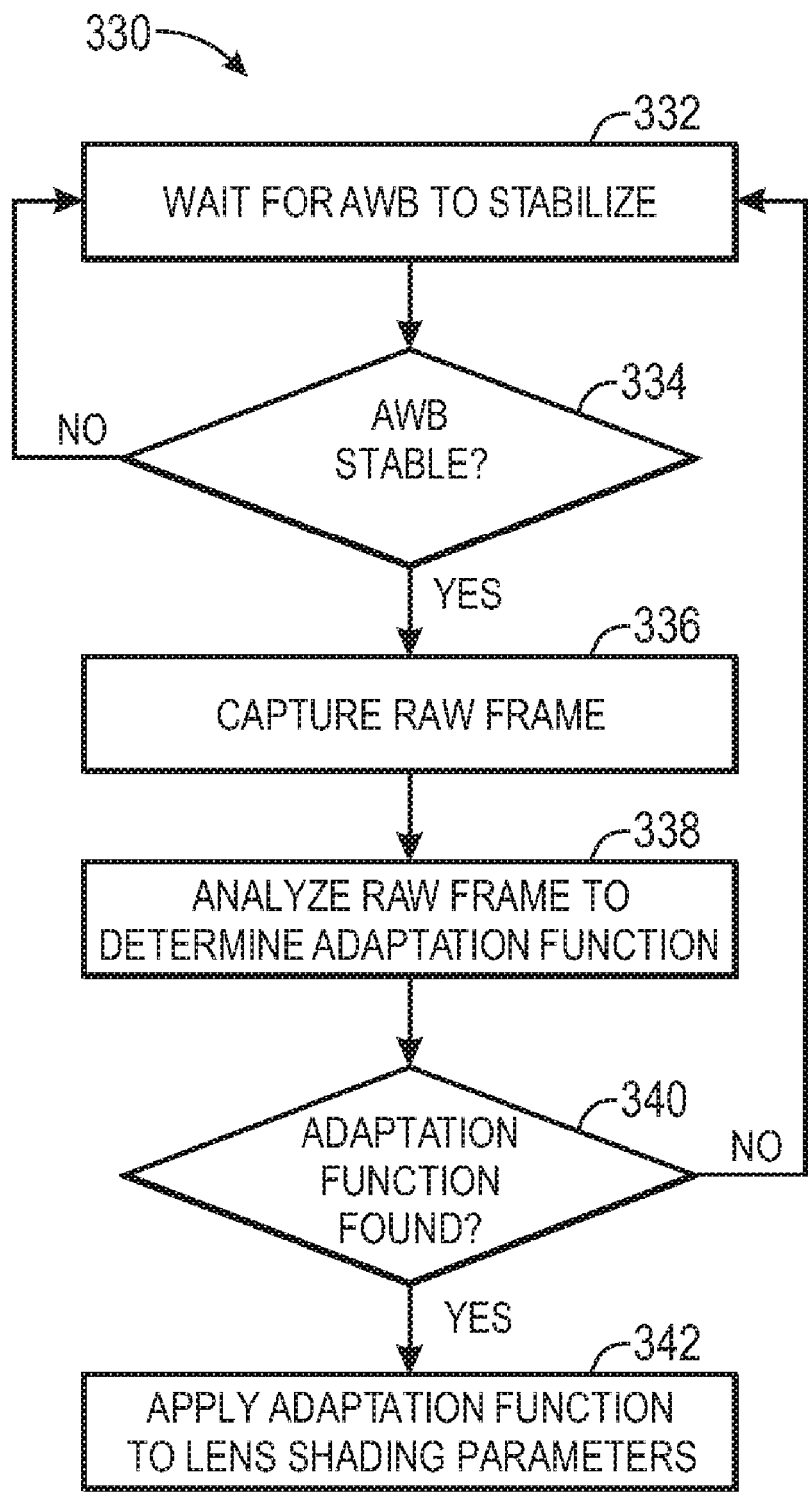
FIG. 23 is a flow chart depicting a process for adapting lens shading correction parameters based on a current illuminant, in accordance with one embodiment.

The techniques described above with respect to lens shading correction may be further illustrated by way of the flow chart shown in FIG. 23, which depicts a method 330. As discussed above, a change in auto-white balance (AWB) may indicate a change in a lighting source and may be used to trigger the capture of a raw frame for analysis to determine whether lens shading parameters should be adjusted. Accordingly, method 330 begins at block 332 and waits for AWB to stabilize. Next, decision logic 334 determines whether AWB has stabilized. In one embodiment, decision logic 334 may determine this based on whether AWB values remain stable for a particular number of frames (e.g., between 2-10 frames). If AWB is not yet stable (e.g., the lighting source is changing or the image capture device is moving), the method 330 returns to block 332. If decision logic 334 determines that AWB is stable, then the method 330 continues to block 336 at which a raw frame from the image sensor 116 is captured for analysis (e.g., stored in buffer 144).

Next, at block 338, the raw reference frame captured at block 336 is analyzed using the available adaptation functions (FIG. 22). For instance, as mentioned above, the frame analysis logic 278 may apply the adaptation functions to generally neutral regions of the captured frame and may attempt to select the adaptation function corresponding to a reference illuminant that most closely matches the current illuminant. This process will be described in more detail below with respect to FIG. 24. Decision logic 340 determines whether an adaptation function is found. If no adaptation function is found as a result of the analysis at block 338, the current lens shading profile will continue to be applied (e.g., with out a newly selected adaptation function), and the method 330 returns to block 332 and waits for AWB to stabilize and trigger the capture of a subsequent frame for analysis. In some embodiments, the ISP system 272 may be configured to wait for a particular amount of time (e.g., 15 to 60 seconds) before returning to block 332. If decision logic 340 indicates that an adaptation function is found, the selected adaptation function is then applied to the lens shading parameters, as indicated at block 342.

Figure 24:
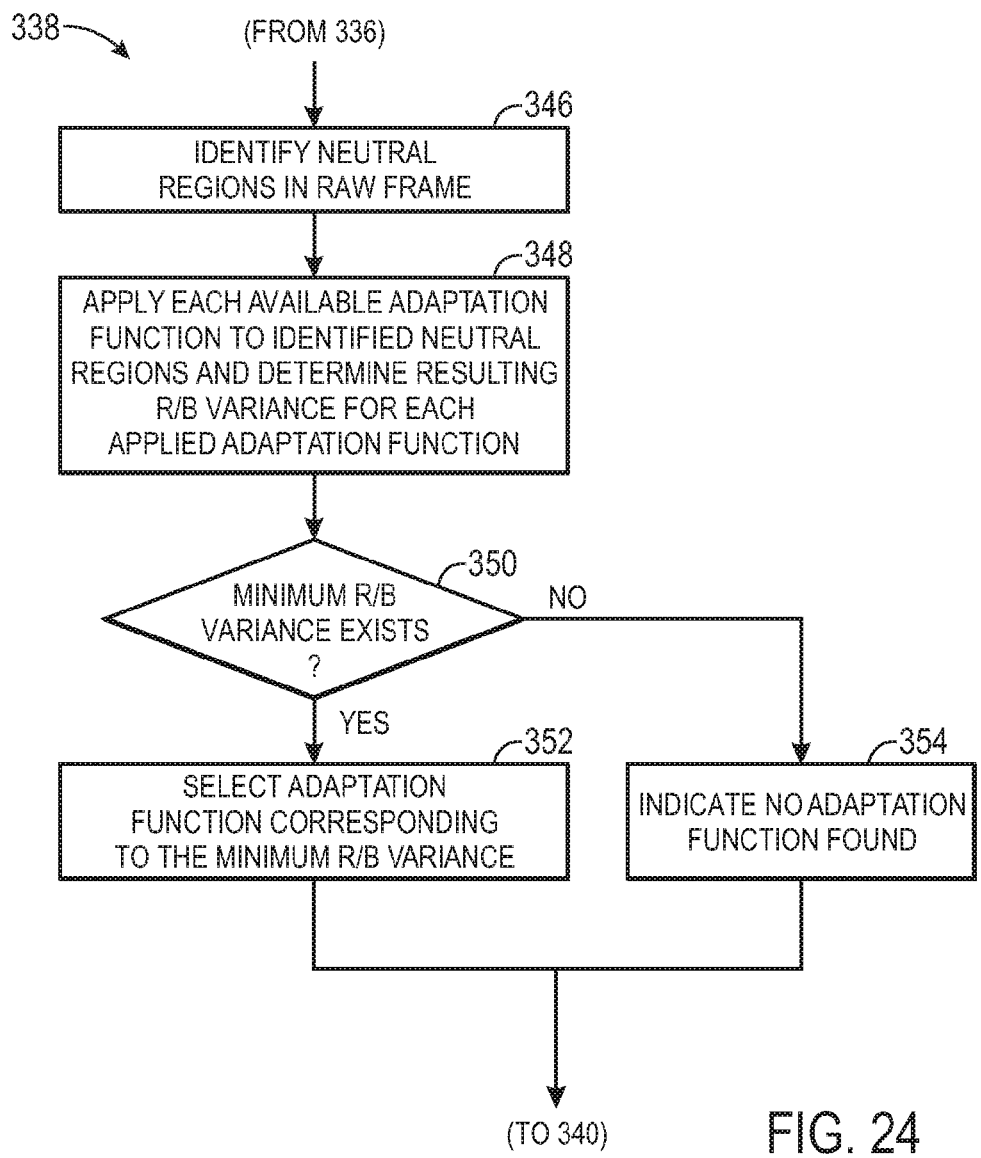
FIG. 24 is a flow chart illustrating a process for selecting a lens shading adaptation function based upon a current illuminant, in accordance with one embodiment.
Figure 25:
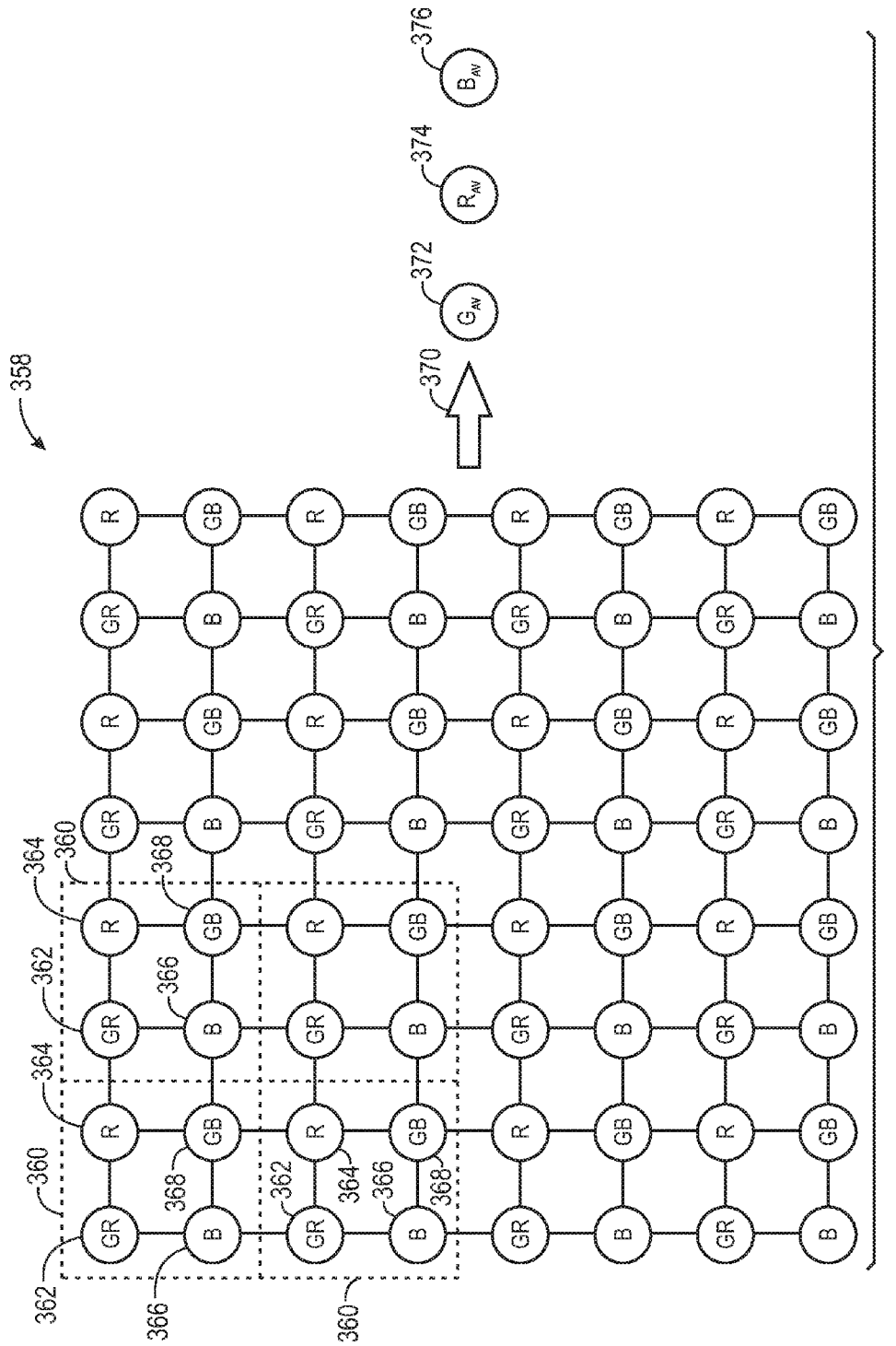
FIG. 25 illustrates techniques for determining averaged color values within subsets of a reference image frame, in accordance with one embodiment.

The process of analyzing the captured raw frame, as represented by block 338 of FIG. 23, is illustrated in more detail in FIG. 24 in accordance with one embodiment. As shown, the process 338 of analyzing the raw frame may begin at block 346 by identifying one or more neutral regions within the raw frame. For instance, in one embodiment, the captured raw frame may be analyzed in samples of 8×8 blocks 358 of pixels, an example of which is shown in FIG. 25. For image sensors utilizing a Bayer color filter array, the 8×8 block may include sixteen 2×2 Bayer quads (e.g., a 2×2 block of pixels representing the Bayer pattern), referred to in FIG. 25 by reference number 360. Using this arrangement, each color channel includes a 4×4 block of corresponding pixels within the sample 358, and same-colored pixels may be averaged to produce an average color value for each color channel within the sample 358. For instance, the red pixels 364 may be averaged to obtain an average red value ($R_{AV}$), and the blue pixels 366 may be averaged to obtain an average blue value ($B_{AV}$) within the sample 358. With regard to averaging of the green pixels, several techniques may be utilized since the Bayer pattern has twice as many green samples as red or blue samples. In one embodiment, the average green value ($G_{AV}$) may be obtained by averaging just the Gr pixels 362, just the Gb pixels 368, or all of the Gr and Gb pixels 362 and 368 together. In another embodiment, the Gr and Gb pixels in each Bayer quad 360 may be averaged, and the average of the green values for each Bayer quad 360 may be further averaged together to obtain $G_{AV}$. As will be appreciated, the averaging of the pixel values across pixel blocks may provide for noise reduction. Further, it should be understood that the use of an 8×8 block as a sample is merely intended to provide one example. Indeed, in other embodiments, any suitable block size may be utilized (e.g., 4×4, 16×16, 32×32, etc.).

Referring again to FIG. 24, generally neutral regions in the captured raw frame may be determined by obtaining color averages of samples of the raw frame, as discussed with reference to FIG. 25, and identifying the regions within the raw frame that share similar G/B ratio values. Next, as indicated at block 348, lens shading models based on each of the available adaptation functions are applied to the pixels within the neutral regions, and the variance of R/B ratio values within the neutral regions is determined for each adaptation function. Decision logic 350 then determines if a minimum variance of R/B ratio values exists. If a minimum is found, the adaptation function yielding the minimum variance in R/B ratio values is selected, as shown at block 352. If no minimum is found (e.g., the lowest variances in R/B ratio includes two or more equal values), decision logic 350 may indicate that no adaptation function is found at block 354. The output of blocks 352 and 354 may continue to block 340 of FIG. 23.

Figure 26:
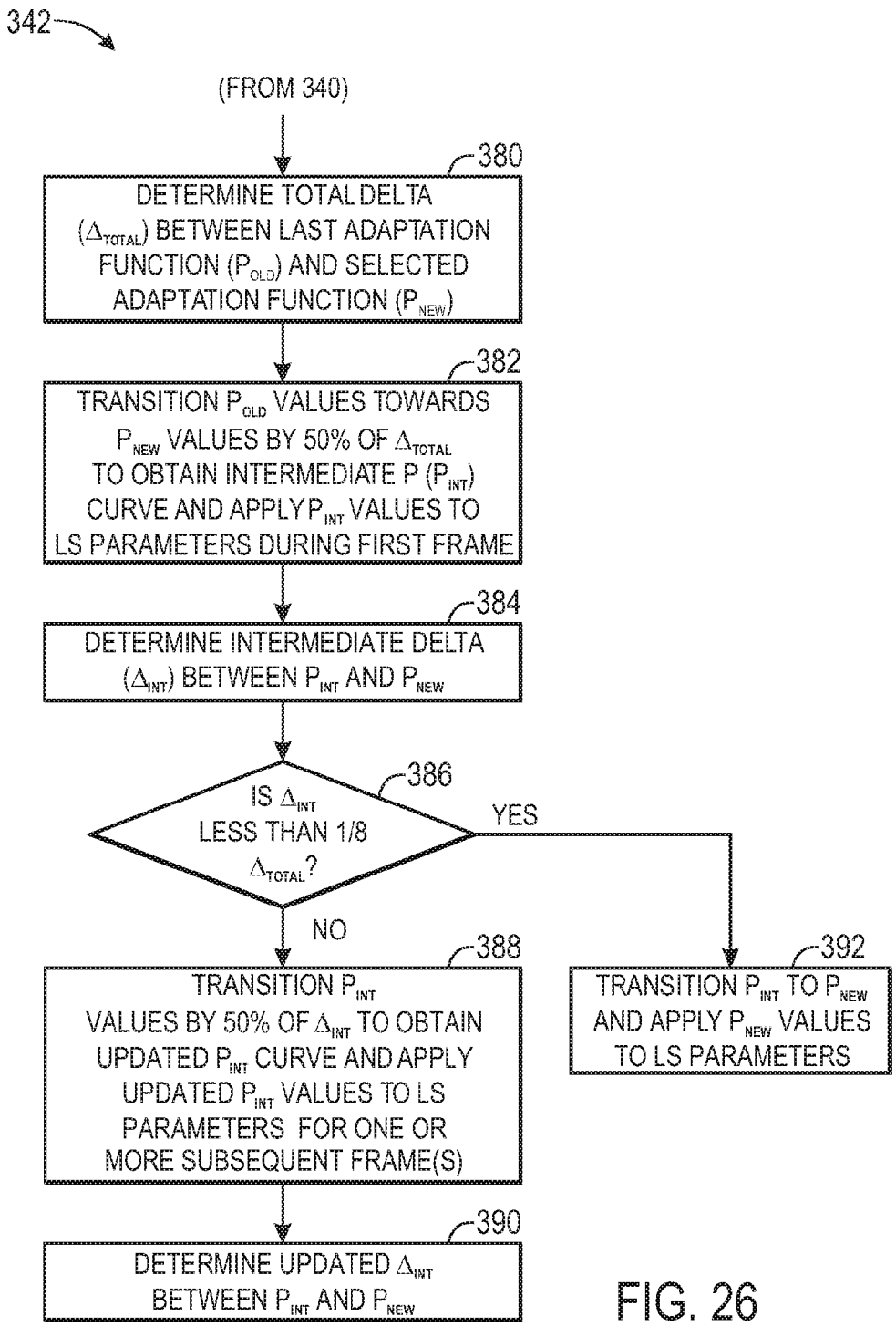
FIGS. 26 and 27 illustrate a process for applying a selected lens shading adaptation curve to the ISP system of FIG. 17, in accordance with one embodiment.
Figure 27:
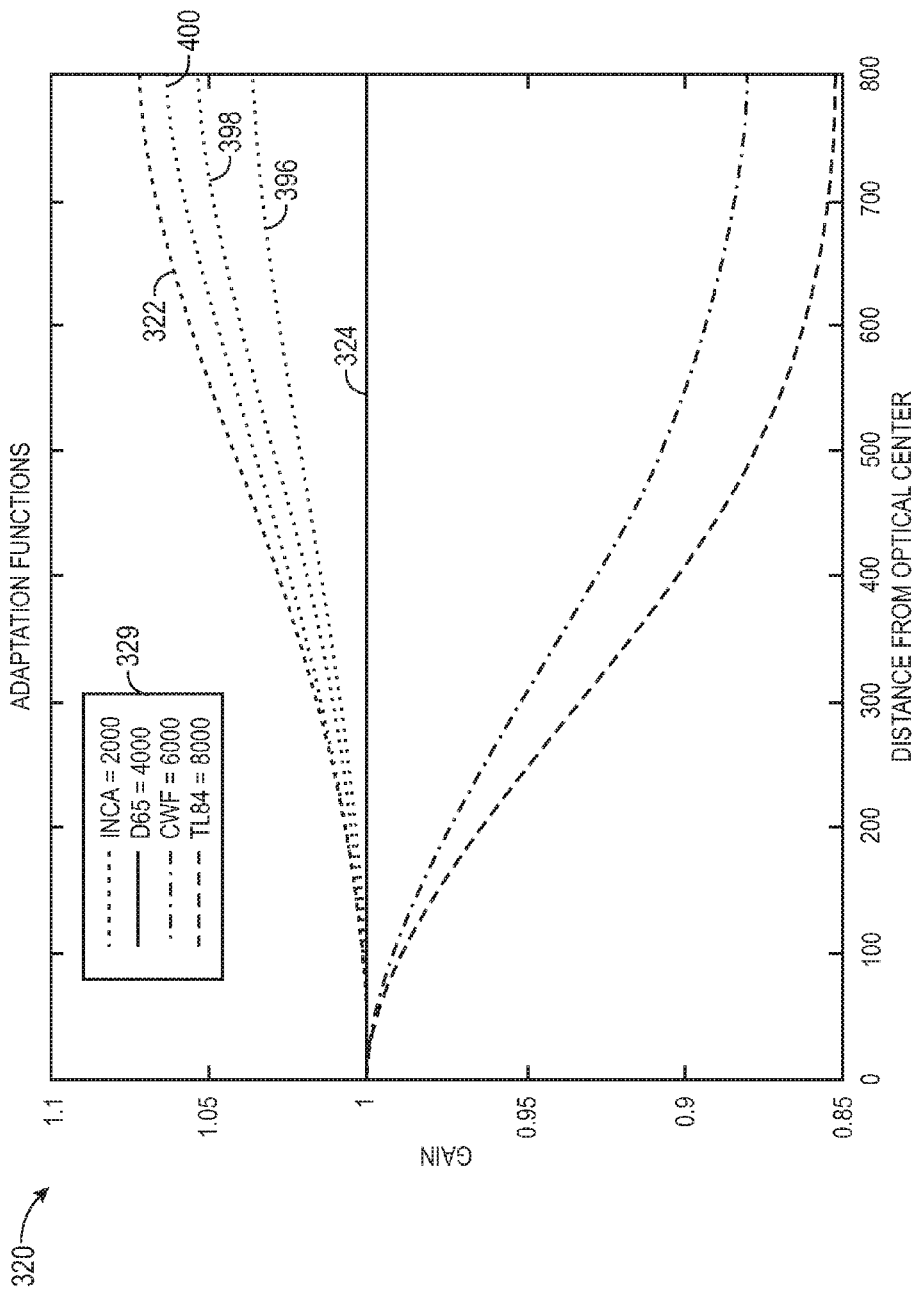

FIG. 26 illustrates this process of applying an adaptation function to the lens shading parameters, as represented by block 338 of FIG. 23. Particularly, FIG. 26 illustrates an embodiment in which an adaptation function is applied using an infinite impulse response (IIR) filter. To provide for a smoother transition between lens shading profiles, a current lens shading profile may gradually transition to a lens shading profile based on a selected adaptation function over several frames by way of several intervening steps. As will be appreciated, this gradual transition may present a more visually pleasing result when compared to switching lens shading profiles immediately (e.g., in a single frame without gradual steps). FIG. 27, which shows the transition from the adaptation function 324 (D65) to the adaptation function 322 (IncA), serves to provide an illustrative example of the process 342 and should be viewed in conjunction with the description of FIG. 26.

As shown, the process 342 begins at block 380 where a total delta ($\Delta_{total}$) between the adaptation values the last or previously selected adaptation function ($P_{old}$) and the adaptation function ($P_{new}$) selected at block 338 (FIG. 23) is determined. For instance, the $\Delta_{total}$ may collectively represent the absolute difference between each point along the curve 324 and each corresponding point along the curve 322.

At block 382, the $P_{old}$ values (curve 324) are transitioned towards the $P_{new}$ values by 50 percent of $\Delta_{total}$ to obtain an intermediate adaptation curve, $P_{int}$, that is between $P_{old}$ and $P_{new}$. This is illustrated in FIG. 27 by the curve 396, which may have a value of 3000 (between 2000 and 4000). Thus, the $P_{int}$ function determined at block 382 is applied to the lens shading parameters 284 to generate an intermediate set of corrected lens shading parameters for one or more frames. Next, at block 384, the process 342 determines an intermediate delta ($\Delta_{int}$) between $P_{int}$ (curve 396) and $P_{new}$ (curve 322). Like the determination of $\Delta_{total}$ at block 380, $\Delta_{int}$ may represent the absolute difference between each point along the curve 396 and each corresponding point along the curve 322.

Next, decision logic 386 determines if $\Delta_{int}$ is less than or equal to 1/8 of $\Delta_{total}$. If $\Delta_{int}$ is not less than 1/8 of $\Delta_{total}$, the process 342 continues to block 388, whereat the $P_{int}$ values from block 382 (curve 396) are transitioned towards the $P_{new}$ values by 50 percent of $\Delta_{int}$ to obtain an updated $P_{int}$ curve, shown as curve 398 in FIG. 27 (having a value of 2500). This updated $P_{int}$ function is applied to the lens shading parameters 284 to generate an updated set of intermediate corrected lens shading parameters for one or more frames. Thereafter, an updated $\Delta_{int}$ is determined between the updated $P_{int}$ (curve 398) and $P_{new}$. The process 342 then returns to decision logic 386. Here, because the current $\Delta_{int}$ is still greater than 1/8 of $\Delta_{total}$, the process 342 will repeat the steps at blocks 388 and 390 to obtain an updated $\Delta_{int}$ that represents the different between an updated $P_{int}$, shown as curve 400 in FIG. 27 (having a value of 2250).

Returning to decision logic 386, because the updated $\Delta_{int}$ is now equal to 1/8 $\Delta_{total}$, the process 342 continues to block 392, and the $P_{int}$ values corresponding to curve 400 of FIG. 27 may transition to their corresponding $P_{new}$ values at curve 322. Thereafter, the $P_{new}$ adaptation values may be applied to the lens shading parameters to generate a corrected set of lens shading parameters for the red color channel. Thus, the embodiment of the process illustrated in FIG. 26 essentially provides for a gradual transition using a first step that is 50 percent of $\Delta_{total}$, a second step that is 25 percent of $\Delta_{total}$, followed by a third step that is 12.5 percent (1/8) $\Delta_{total}$. As discussed above, this provides a gradual transition between two different lens shading profiles over several frames that may be more aesthetically pleasing to a viewer when compared to transitioning $P_{old}$ to $P_{new}$ in a single frame. It should be appreciated, however, that any suitable step sizes, including steps of the sizes, may be utilized in other embodiments.

It should be understood that the process shown in FIG. 26 is merely intended to provide one example of a technique for transitioning between lens shading adaptation functions. In other embodiments, the specific parameters shown in blocks 382 and 388 may vary and may be different for various implementations. For instance, in one embodiment, the transition steps may be constant instead of gradually decreasing (e.g., 1/3, 1/4, 1/5, 1/6, or 1/8 of $\Delta_{total}$). Additionally, in other embodiments may utilize an absolute delta (e.g., adjusting lens shading gains by a particular gain amount during each intermediate transition step), rather than using ratios. In a further embodiment, the transition between lens shading adaptation functions may also be applied using non-IIR filtering techniques.

While the above-discussed embodiments have focused on lens shading artifacts resulting from the increased deviation of the red color channel's response to illuminants with higher IR content, it should be appreciated that similar techniques may also be applied to generate corrected lens shading parameters for other color channels. For instance, if the green or blue color channels are subjected to some condition that produces an undesirable deviation from the expected $\cos^4$ curve, the responses of the green and blue color channels may be modeled based on one or more reference illuminants (e.g., D65, CWF, TL84, IncA) and corresponding adaptation functions may be derived using, for instance, a fourth order polynomial function based on a distance from an optical center of the lens.

Additionally, it should be understood that the four reference illuminants provided above are intended to provide an example of just one embodiment. As will be appreciated, additional reference illuminants may be modeled and corresponding adaptation functions may be derived. The characteristics of these additional reference illuminants and their adaptation values may be made accessible to the additional pipeline 272 (e.g., storing in firmware or memory) and, in some instances, may be provided to the device 10 via a software or firmware update. In some instances, additional reference illuminants may be derived via interpolation of known illuminant types.

Figure 28:
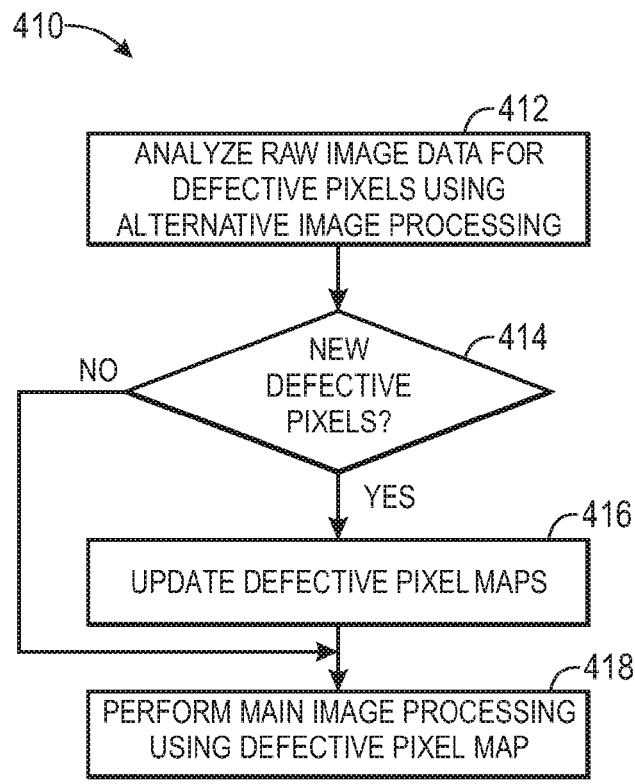
FIG. 28 is a flowchart describing an embodiment of a method for correcting a defective pixel map before performing main image processing.

In addition to determining feed-forward main image processing 24 control parameters for black level correction and lens shading correction, the alternative image processing 56 also may be used for updating a defective pixel mapping employed by the main image processing 24. For example, as shown by a flowchart 410 of FIG. 28, the alternative image processing 56 may analyze raw image data for defective pixels of the image capture device 20 (block 412). Since defective pixels may occur in greater numbers over time, the activity of block 412 may take place periodically or each time the alternative image processing 56 analyzes a frame of raw image data. By way of example, in some embodiments, the alternative image processing 56 may analyze the raw image data for defective pixels no more than once each day, week, or month, and so forth. In other embodiments, the alternative image processing 56 may analyze a frame of raw image data for defective pixels each time the alternative image processing 56 analyzes a frame of raw image data to determine other main image processing 24 control parameters (e.g., black level correction or lens shading correction).

If the alternative image processing 56 detects new defective pixels not previously detected (decision block 414), the alternative image processing 56 may cause a defective pixel map associated with the main image processing to be updated (block 416). For example, the alternative image processing 56 may directly update a defective pixel map used by the main image processing 24 or the alternative image processing 56 may cause firmware 68 associated with the main image processing 24 to update the defective pixel map. On the other hand, when no new defective pixels are detected (decision block 414), block 416 may not be carried out. Thereafter, the main image processing 24 may be carried out according to the defective pixel map (block 418), now updated to include all defective pixels of the image capture device 20.

The raw image data from the image capture circuitry 20 that has been transferred in parallel to the memory 14 may be used by the alternative image processing 56 in still other ways. For example, the raw image data may enable image reprocessing for times when the main image processing 24 yields unsatisfactory results. That is, the raw image data may be used by the alternative image processing 56 to produce a better final image when the main image processing 24 initially yields an unsatisfactory final image.

Figure 29:
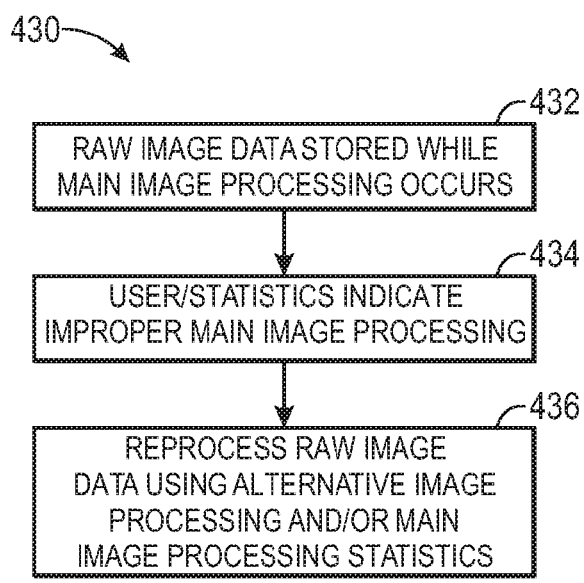
FIG. 29 is a flowchart describing an embodiment of a method for reprocessing an image if main image processing produces an unsatisfactory result.

As shown by a flowchart 430 of FIG. 29, such an image reprocessing capability may become available when a frame of raw image data is stored in the memory 14 while the main image processing 24 performs image processing on a copy of the same frame of raw image data (block 432). In some embodiments, the raw image data may be stored in the nonvolatile storage 16 and associated with the final image processed by the main image processing 24. Once the image has been processed to determine a final processed image, user feedback or statistics from a statistics engine 60 of the main image processing 24 may indicate that the main image processing 24 did not produce a satisfactory image (block 434). For example, if the image appears too dark or too bright, or if the automatic white balance (AWB) appears to have performed white balancing based on the wrong color temperature, the user may indicate that image should be reprocessed. By way of example, after the main image processing 24 has produced a final image, the final image may be displayed on the display 18. The user, unsatisfied with the results, may provide feedback to the electronic device 10 to indicate their dissatisfaction (e.g., by shaking the electronic device 10).

In response, the raw image data saved in the memory 14 or the nonvolatile storage 16 then may be reprocessed using the alternative image processing 56 or the main image processing 24 in an attempt to achieve a more satisfactory result (block 436). For example, in some embodiments, the raw image data may be analyzed by the alternative image processing 56 to obtain new main image processing 24 control parameters, as described in greater detail above. Thereafter, the raw image data may be reloaded into the main image processing 24, which may reprocess the raw image data according to the new main image processing 24 control parameters. In other embodiments, the alternative image processing 56 may process the raw image data instead of the main image processing 24. The alternative image processing 56 may, in some embodiments, employ certain of the main image processing statistics from the statistics engine 60 of the main image processing 24 to vary the manner in which the alternative image processing 56 takes place. That is, the alternative image processing 56 may estimate why the main image processing 24 failed to produce a satisfactory final image and adjust its image processing techniques accordingly. If the user remains unsatisfied with the reprocessed final image, the main image processing 24 and/or the alternative image processing 56 may reprocess the raw image data yet again in the manner of the flowchart 430 of FIG. 29.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method comprising:
providing a set of lens shading adaptation functions, wherein each of the lens shading adaptation functions corresponds to a respective reference illuminant;
providing a plurality of image frames captured by an image sensor under current illuminant conditions to a hardware image signal processing pipeline;
using an additional image processing pipeline to perform alternative image processing by analyzing a reference frame from a plurality of image frames to select the lens shading adaptation function corresponding to a reference illuminant that most closely matches characteristics of the current illuminant conditions;
adjusting a set of lens shading parameters based upon the selected lens shading adaptation function;
providing the adjusted lens shading parameters to a hardware image signal processing pipeline as feed-forward parameters; and
using the hardware image signal processing pipeline to process the plurality of image frames based on the adjusted lens shading parameters.

2. The method of claim 1, wherein the plurality of image frames captured by the image sensor comprises red, green, and blue color channels.

3. The method of claim 2, wherein analyzing the reference frame to select the lens shading adaptation function comprises:
identifying generally neutral regions within the reference frame;
applying each of the lens shading adaptation functions to the reference frame and determining, for each of the lens shading adaptation functions, a variance of red to blue ratio values within the neutral regions; and
selecting the lens shading adaptation function corresponding to a minimum variance if the minimum variance exists.

4. The method of claim 3, wherein, if a minimum variance does not exist, a lens shading adaptation function is not selected, the lens shading parameters are not adjusted, and the hardware image signal processing pipeline processes the plurality of image frames using the unadjusted lens shading parameters.

5. The method of claim 3, wherein identifying generally neutral regions within the reference frame comprises:
analyzing subsets of the reference frame;

for each subset, determining averaged color values for each of the blue and green color channels and calculating a blue to green ratio based upon the averaged blue color value and the averaged green color value; and identifying the subsets within the reference frame having similar blue to green ratios as generally neutral regions.

6. The method of claim 5, wherein each subset comprises an 8×8 block of pixels.

7. The method of claim 6, wherein the 8×8 block of pixels comprises Bayer image data having a first green channel and a second green channel, and wherein the averaged green color value is determined based upon the first green channel, the second green channel, or a combination thereof.

8. A system comprising:
a first image processing pipeline configured to receive frames of image data generated by an image sensor and to process the frames of image data to compensate for lens shading fall-off in the frames using a set of lens shading parameters;
a feed-forward loop comprising a second image processing pipeline configured to receive, in parallel with the first image processing pipeline, at least one of the frames of image data generated by the image sensor and to select a lens shading adaptation function from a set of available lens shading adaptation functions to compensate for the sensitivity of a lens shading response due to certain wavelengths of light for at least one color channel of the image data;
wherein the feed-forward loop is configured to adjust the set of lens shading parameters used by the first image processing pipeline based on the selected lens shading adaptation function.

9. The system of claim 8, wherein the at least one color channel comprises a red color channel.

10. The system of claim 9, wherein the certain wavelengths comprise light having a wavelength of between approximately 600 to 650 nanometers.

11. The system of claim 8, wherein each of the set of available lens shading adaptation functions is modeled based upon the lens shading response of the at least one color channel to a respective one of a set of reference illuminants.

12. The system of claim 11, wherein the set of reference illuminants comprises at least one of a simulated daylight illuminant, a fluorescent illuminant, and an incandescent illuminant.

13. The system of claim 8, wherein the second image processing pipeline comprises a memory encoded with image analysis software executable by a processor, and wherein the second image processing pipeline is configured to analyze the at least one frame by execution of the image analysis software by the processor.

14. A method comprising:
using a hardware image processing pipeline to receive a plurality of image frames generated by a digital image sensor and to apply lens shading correction to each of the plurality of image frames on a per-pixel basis based upon a set of lens shading gains.
using a second image processing pipeline to store at least one image frame from the plurality of image frames and to analyze the at least one image frame, wherein the second image processing pipeline is configured to select a set of lens shading adaptation values based upon the analysis, to adjust the set of lens shading gains based upon the selected set of lens shading adaptation values, and to provide the adjusted set of lens shading gains to the hardware image processing pipeline as feed-forward control parameters.

15. The method of claim 14, wherein the set of lens shading adaptation values is selected from a plurality of sets of lens shading adaptation values, wherein each of the sets of lens shading adaptation values is modeled based at least partially upon the response to different types of lighting conditions of an infrared cutoff filter associated with the digital image sensor.

16. The method of claim 14, wherein the second image processing pipeline is configured to store and analyze the at least one image frame upon detecting a change in the lighting conditions.

17. The method of claim 14, wherein detecting the change in the lighting conditions comprises detecting a change in auto-white balance values and waiting for the auto-white balance values to stabilize.

18. The method of claim 17, wherein waiting for the auto-white balance values to stabilize comprises determining if the auto-white balance values remain stable for at least two image frames.

19. An electronic device comprising:
a processor;
a memory containing image analysis software executable by the processor;
an image capture device comprising an image sensor configured to capture raw image data;
a first image processing pipeline configured to receive the raw image data and to apply lens shading correction to the raw image data using a set of lens shading parameters; and
a feed-forward loop comprising a second image processing pipeline configured to receive at least one frame of the raw image data, to analyze the at least one frame using the image analysis software to select a lens shading adaptation function for the at least one frame, and to adjust the lens shading parameters using one or more intermediate transition steps based upon the selected lens shading adaptation function over a plurality of image frames to obtain a final set of adjusted lens shading parameters;
wherein the first image processing pipeline is configured to receive the intermediate adjusted lens shading parameters and the final adjusted lens shading parameters as feed-forward outputs from the feed-forward loop and to apply the intermediate and adjusted lens shading parameters to the raw image data.

20. The electronic device of claim 19, comprising an infinite impulse response (IIR) filter configured to determine the one or more intermediate transition steps.

21. The electronic device of claim 20, wherein the adjustment of the lens shading parameters by the image analysis software using the one or more transition steps comprises:
determining a total difference between the currently selected lens shading adaptation function and a lens shading adaptation function selected for the previous frame analyzed by the second image processing pipeline;
during a first transition step, adjusting the lens shading adaptation values corresponding to the previously selected lens shading adaptation function towards the lens shading values corresponding to the currently selected lens shading adaptation function by approximately 50 percent of the total difference during a first set of one or more frames to produce a first intermediate set of lens shading adaptation values;
during a second transition step, adjusting the first intermediate set of lens shading adaptation values towards the lens shading values corresponding to the currently selected lens shading adaptation function by approximately 25 percent of the total difference during a second set of one or more frames subsequent to the first set of one or more frames to produce a second intermediate set of lens shading adaptation values;

during a third transition step, adjusting the second intermediate set of lens shading adaptation values towards the lens shading values corresponding to the currently selected lens shading adaptation function by approximately 12.5 percent of the total difference during a third set of one or more frames subsequent to the second set of one or more frames to produce a third intermediate set of lens shading adaptation values; and during a fourth transition step, setting the lens shading adaptation values corresponding to the currently selected lens shading adaptation function as the adjusted lens shading parameters.

22. The electronic device of claim 21, wherein the image processing pipeline is configured to apply lens shading correction to the raw image data based upon the first intermediate set of lens shading adaptation values during the first set of one or more frames, apply lens shading correction to the raw image data based upon the second intermediate set of lens shading adaptation values during the second set of one or more frames, and apply lens shading correction to the raw image data based upon the third intermediate set of lens shading adaptation values during the third set of one or more frames.

23. The electronic device of claim 19, wherein the at least one frame is received via a memory using a direct memory access (DMA) interface.

24. The electronic device of claim 19, wherein the lens shading adaptation function is selected from a plurality of available lens shading adaptation functions, each being modeled as a fourth power polynomial based on the distance from an optical center of a lens of the image capture device corresponding to the lens shading response of a red color channel to different types of illuminants.

25. The electronic device of claim 19, wherein the image sensor comprises a Bayer image sensor.

26. The electronic device of claim 19, comprising a desktop computer, a laptop computer, a tablet computer, a mobile cellular telephone, a portable digital media player, or some combination thereof.

* * * * *